(12) United States Patent
Hitoe et al.

(10) Patent No.: US 8,309,227 B2
(45) Date of Patent: Nov. 13, 2012

(54) CARBON FIBROUS AGGREGATOR, METHOD FOR MANUFACTURING THEREOF, AND COMPOSITE MATERIAL INCLUDING THEREOF

(75) Inventors: Yoshinori Hitoe, Tokyo (JP); Jun Suzuki, Tokyo (JP)

(73) Assignee: Hodogaya Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/006,892

(22) Filed: Jan. 14, 2011

(65) Prior Publication Data
US 2011/0168942 A1 Jul. 14, 2011

Related U.S. Application Data

(63) Continuation-in-part of application No. PCT/JP2009/062889, filed on Jul. 16, 2009.

(30) Foreign Application Priority Data

Jul. 16, 2008 (JP) ................. 2008-185270

(51) Int. Cl.
*B32B 9/00* (2006.01)
*B32B 5/16* (2006.01)
*D02G 3/00* (2006.01)
(52) U.S. Cl. ......... 428/408; 428/401; 428/402; 428/372
(58) Field of Classification Search ............... None
See application file for complete search history.

(56) References Cited

U.S. PATENT DOCUMENTS

| 6,878,360 | B1 | 4/2005 | Ohsaki et al. ............. 423/447.3 |
| 7,824,768 | B2 * | 11/2010 | Shan et al. .................... 428/370 |
| 2009/0087638 | A1 | 4/2009 | Shan et al. ................ 428/292.1 |
| 2009/0162636 | A1 | 6/2009 | Shan et al. .................... 428/323 |

FOREIGN PATENT DOCUMENTS

| EP | 1950329 | 7/2008 |
| EP | 1995361 | 11/2008 |
| JP | 03-74465 | 3/1991 |
| JP | 2001-073231 A | 3/2001 |
| JP | 2002-266170 | 9/2002 |

(Continued)

OTHER PUBLICATIONS

Search report from E.P.O. that issued with respect to patent family member European Patent Application No. 09797970.2, mail date is Nov. 2, 2011.

(Continued)

*Primary Examiner* — Camie Thompson
(74) *Attorney, Agent, or Firm* — Greenblum & Bernstein, P.L.C.

(57) ABSTRACT

Carbon fibrous aggregator obtained by a chemical vapor phase growing method, which comprises plural granular parts, and plural carbon fibers which are mutually independently extended outwardly from their respective granular parts so that each granular part is associated with two or more of carbon fibers, wherein the carbon fibers show a three dimensional expansion in all; and
which show a three dimensional network structure of the carbon fibers at least in a part by a state that at least a part of the plural carbon fibers extended from one granular part is linked with another granular part;
wherein mean length of carbon fibers which link two granular parts together is of 3.0-20.0 μm, and
wherein a coefficient of variation, CV, ((standard deviation/mean value)×100) which is obtained on a determination of outer diameter distribution of the carbon fibers which constitute the aggregator of carbon fiber is not more than 30%.

17 Claims, 18 Drawing Sheets

FOREIGN PATENT DOCUMENTS

| | | |
|---|---|---|
| JP | 02003-201630 A | 7/2003 |
| JP | 2004-119386 | 4/2004 |
| JP | 2004-331452 | 11/2004 |
| JP | 2006-97221 | 4/2006 |
| JP | 3776111 | 5/2006 |
| JP | 2007-39838 A | 2/2007 |
| WO | WO 2007/058297 A1 | 5/2007 |

OTHER PUBLICATIONS

U.S. Appl. No. 13/123,388 to Naohiro Tarumoto et al., which was filed on Apr. 8, 2011.

U.S. Appl. No. 13/002,064 to Yoshinori Hitoe et al., which was filed on Dec. 30, 2010.

* cited by examiner

CARBON FIBROUS AGGREGATOR, METHOD FOR MANUFACTURING THEREOF, AND COMPOSITE MATERIAL INCLUDING THEREOF

The present application is a continuation-in-part of International Application No. PCT/JP2009/062889, filed on Jul. 16, 2009, and claims the benefit of priority from Japanese Patent Application No. 2008-185270, filed on Jul. 16, 2008, the contents of which are herein incorporated by reference in their entireties.

TECHNICAL FIELD

This invention relates to an aggregator of carbon fibers in which outside diameters of the carbon fibers show a sharp distribution, a method for manufacturing thereof, and a composite material including the aggregators. More particularly, this invention relates to the aggregator of carbon fibers, wherein plural numbers of carbon fibers are independently elongated from granular part(s), and which shows a three dimensional expansion in all, and thus a plural number of the aggregators are able to be utilized as additives to be added to a material such as resin, ceramics, metal, etc., to improve a physical property of the material, such as electric, mechanical, or thermal property, and also as additives to be added to liquid material such as fuel, lubricant oil, etc., to improve a physical property of the liquid material, such as electrical, or thermal property, and which tends to distribute uniformly with ease on such an addition. Especially, for the injection molding of resin, the aggregators are able to be utilized as additives which contribute stably a uniformity of electrical conductivities between the surface and interior of an injection molded product, and which give the injection molded product various physical properties stably. For instance, the aggregators are capable of forming a composition material which exhibits a small deviation value in the electrical conductivity and so on. Further, this invention relates to provide an aggregator of the carbon fibers which is characterized in that it shows an appearance of extending outwardly from a centre part with a three dimensional expansion, and it has a sharp distribution for the outside diameters of the carbon fibers, a method for manufacturing thereof, and a composite material including the aggregators.

BACKGROUND ART

To date, carbon fibers have been used in various composite materials because of their good mechanical properties, high electrical conductivity, high thermal conductivity, etc.

Recently, higher functionalities have come to be required for various materials. Additives which can improve physical properties, such as electrical, mechanical, or thermal properties, of a matrix comprised of solid materials, such as resin, ceramics, and metal, without damaging the characteristics of the matrix have been sought after. Additionally, additives which can improve physical properties of liquids, such as fuels, oil, and lubricants have also been sought.

By the way, regarding the carbon fiber, fine carbon fibers, such as carbon nano structures exemplified by the carbon nanotube (hereinafter, referred to also as "CNT"), have been attracting public attention in various fields.

The graphite layers that make up the carbon nano structures are materials normally comprised of regular arrays of six-membered rings whose structures can bring about specific electrical properties, as well as chemically, mechanically, and thermally stable properties. As long as such fine carbon fibers can retain such properties upon combining and dispersing into solid materials, including various resins, ceramics, metals, etc., or into liquid materials, including fuels, lubricant agents, etc., their usefulness as additives for improving material properties can be expected.

To date, tasks of developing a mass production of the CNTs or fine carbon fibers, enhancing their purity, and developing their separation and purifying techniques have been regarded as important, and many surface improvements and dispersion techniques, and application developments have been proposed. However, the most important theme of technical development for the CNTs is the technique of mass production of CNTs which can disperse easily and uniformly in a composite material. The reason that it has been not attained satisfactorily is ascribable to the diversity of the structures of the CNTs and fine carbon fibers.

As being different from normal molecules, the CNTs possess specific characteristic variables such as thickness (outside diameter), length, chirality, and spatial construction, and it is conceivable that these variables can be controlled at the synthetic stage of CNTs. However, such controls in the synthesis for CNTs of under nano levels have not been sufficiently attained yet. Typical reports for CNTs and fine carbon fibers will be described below.

Patent Literature 1 discloses a resin composition comprising agglomerates wherein each of the agglomerate is composed of mutually entangled carbon fibrils having 3.5-70 nm in diameter, and wherein the agglomerates possess a diameter in the range of 0.10 to 0.25 mm with a maximum diameter of not more than 0.25 mm. It is noted that the numeric data such as the maximum diameter, diameter, etc., for the carbon fibril agglomerates are those measured prior to combining with a resin, as is clear from the descriptions in the examples and other parts of the Patent Literature 1.

Patent Literature 2 discloses a composite material where a carbon fibrous material is added to the matrix, the carbon fibrous material mainly comprising agglomerates each of which is composed of carbon fibers having 50-5000 nm in diameter, the mutual contacting points among the carbon fibers being fixed with carbonized carbonaceous substance, and each agglomerate having a size of 5 μm-500 μm. In the Patent Literature 2, the numeric data such as the size of the agglomerate, etc., are those measured prior to the combining into resin, too.

Using carbon fibrous agglomerates such as described above, it is expected that the dispersibility of carbon nano structures within a resin matrix will improve to a certain degree as compared to that of using bigger lumps of carbon fibers. The agglomerates prepared by dispersing carbon fibrils under a certain shearing force, such as in a vibrating ball mill or the like according to the Patent Literature 1, however, have relatively high bulk densities. Thus, they do not fulfill the need for ideal additives that is capable of improving various characteristics, such as electric conductivity, of a matrix effectively at low dosages.

With respect to the carbon fibrous agglomerates disclosed in the Patent Literature 2, it is necessary to provide an additional step for fixing carbon fibers at their mutual contacting points after synthesis of the carbon fibers, and thus the efficiency of manufacturing becomes worse. Further, since the carbon fibrous agglomerate is manufactured by heating carbon fibers in a state such that mutual contacting points among the carbon fibers are formed by compression molding after synthesis of the carbon fibers, and wherein fixing of fibers at the contacting points is done by carbonization of organic residues primarily attached to the surface of the carbon fibers, or carbonization of an organic compound additionally added as a binder, the affixing forces at the contacting points are weak. In addition, the electrical properties of the carbon fibrous agglomerate per se are not well, although a certain degree of improvement in the electrical properties would be expected as compared with the case of pulverized monofibrous carbon fibers. Thus, when these carbon fibrous agglomerates are added to a matrix such as a resin, the carbon fibers fixed at the contacting points are easily detached from each other, and the carbon fibrous agglomerates are no longer maintained in the matrix. Therefore, it is difficult to construct preferable conductive paths in a matrix such that good electrical properties may be conferred on the matrix by a small additive amount of the fibrous agglomerates. Furthermore, when a binder is added to promote fixing and carbonization at the contacting points, fibers in the obtained fibrous agglomerates would have large diameters and inferior surface characteristics because the added binder is attached to the whole surface area of the fibers rather than to a limited area on the contacting points.

Further, in Patent Literature 3, the disclosed is vapor phase method's carbon fibers which is obtained by using the vapor phase method for producing carbon fibers wherein raw material for the carbon fiber, catalyst, etc., are injected toward the inner wall of a reaction chamber, and undergo reaction, and which are characterized in that the mean fibrous diameter is in the range of 80-500 nm, and more than 65% of all fibers are involved in the range of the mean fibrous diameter ±20%. However, since a raw material supplying part used in the vapor phase method adapts a way of activating the reaction by injecting the catalyst which is utilized in the early stage of carbon fiber synthesis toward the inner wall of the reaction chamber, and thus the catalyst is produced by coming into collision with the inner wall of the reaction chamber, it is considered that the turbulence of flows at the region of the catalyst production and the neighborhood of the region is very large. Therefore, the distribution of size of the produced catalysts becomes broader. Thus, it is difficult to produce carbon fibers having a more sharp distribution of the diameter. In addition, since the method where the catalyst comes into collision with the inner wall of the reaction chamber uses only a part of the surface area of the inner surface of the reaction chamber, and it does not use the internal space of the reaction chamber, it will not be suitable to a more developed mass production of carbon fibers.

Patent Literature 4 provides a carbon fibrous structure which has a three dimensional network shape and comprises carbon fibers of 15-100 nm in the outer diameter and which is produced by a vapor phase method. However, the distribution of the fiber outer diameter of the carbon fibrous structure is broad. Thus, when the carbon fibrous structures are added to a resin in order to give the electrical conductivity, or when a composite product is manufactured by the injection molding process, a fear that the skin layer of the product becomes thicker will arise as described below, and the variation in the data of electrical conductivity for the products will be large. Therefore, the development of carbon fibrous aggregate having a sharp distribution of outer diameters of carbon fibers is urgently necessary.

In Patent Literature 5, there are a description about branched carbon fiber, and a description that the reaction should be performed under the condition of using ferric catalyst such as ferrocene at an extreme high concentration in order to enhance the branching degree. However, in this process, since the reaction is activated by injecting the catalyst which is utilized in the early stage of carbon fiber synthesis toward the inner wall of the reaction chamber in order to produce the branched carbon fiber, and thus the same reasons as described above go for this process, it is expected that the production of carbon fibers having a more sharp distribution of the diameter is difficult.

In Patent Literature 6, a dendritic form of fine carbon fibers which bifurcates into many branches and which is produced by the polymer particles' method is disclosed. However, since the method described in this literature depends on charring of the polymer, it is not suitable to the mass production.

PRIOR ART'S LITERATURES

Patent Literatures

Patent Literature 1: JP HEI 03-74465 A
Patent Literature 2: JP 2004-119386 A
Patent Literature 3: JP 2006-97221 A
Patent Literature 4: Japanese Patent No. 3776111
Patent Literature 5: JP 2002-266170 A
Patent Literature 6: JP 2004-331452 A

SUMMARY OF THE INVENTION

Problems to be Solved by this Invention

Therefore, this invention aims to provide an aggregator of carbon fibers in which outside diameters of the carbon fibers show a sharp distribution, and wherein plural numbers of carbon fibers are elongated with a three dimensional expansion.

Since the aggregator has a sharp distribution of outside diameters of the carbon fibers and plural numbers of carbon fibers in the aggregator shows a three dimensional expansion in all and the aggregator is a sparse aggregate of the carbon fibers, the aggregators can be dispersed uniformly in a matrix. Thus, the carbon fibrous aggregators can improve the physical properties, such as electrical, mechanical, or thermal properties, of a matrix while maintaining other properties of the matrix, when added to the matrix at a sufficiently small amount. Particularly, the carbon fibrous aggregators can be used as additives which reduce the thickness of skin layer of a composite product manufactured by the injection molding of resin, or as additives which contribute stably various physical properties of the injection molded product, such as electrical, mechanical, or thermal properties.

Further, a method for producing a novel form of carbon fiber is meaningful because the provision of carbon fibrous aggregators of which carbon fibers have a mean outer diameter according to their usage and a sharp distribution of their outer diameter have been desired.

Recently, the techniques of manufacturing a composite material wherein carbon fibers are added to a resin, or a sheet or the like through steps of dispersing carbon fibers into water or solvent, developing the dispersion thus obtained, and drying up the developed dispersion, become commercially practical. As the usage of these product, for instance, tray for transferring semiconductor device, sheet heater, electromagnetic wave absorber, etc., are exemplified. When area of such a product becomes larger, variations in electrical conductivity, heating temperature, and dynamical property throughout the area will arise. Thus, materials which can make such qualities stable are desired. Therefore, the present invention also aims to provide an aggregator of carbon fibers which can improve the stability of physical properties, such as electrical, mechanical and thermal properties, uniformly regardless the portions to be determined, when the aggregators are added to a matrix such as resin.

Means for Solving the Problems

As a result of our diligent study for solving the above problems, we, the inventors, have found that the effective means for solving the problems is an aggregator of carbon fibers which have been developed by us, the inventors, wherein the carbon fibers have a sharp distribution of their outer diameters while having a certain varying mean diameter according to and suitable to their usage, wherein the carbon fibers are independently elongated from granular part(s), and the carbon fibers are mutually combined tightly by the granular part(s) so that the fibers do not behave individually and wherein the aggregator shows a three dimensional sparse aggregate structure.

Particularly, with respect to the injection molded material of resin, we have found that the followings are effective at providing a fibrous material suitable for various usages, and improving properties of the resin even in a small additive amount:

To show a good dispersibility when kneading with resin or the like;

To make a sparse aggregate structure of the carbon fibers where the fibers are mutually combined so that the fibers do not behave individually and which maintains their sparse aggregate state in the resin matrix;

To adapt carbon fibers that are designed to have a minimum amount of defects; and To keep the variation in values of electrical conductivity, etc., at a low level when adding the fibrous material into resin and manufacturing a composite material having a large area.

After we have had these findings, we have accomplished the present invention.

The present invention for solving the above mentioned problems is, therefore, a carbon fibrous aggregator obtained by a chemical vapor phase growing method, which comprises plural granular parts, and plural carbon fibers which are mutually independently extended outwardly from their respective granular parts so that each granular part is associated with two or more of carbon fibers, wherein the carbon fibers show a three dimensional expansion in all; and which show a three dimensional network structure of the carbon fibers at least in a part by a state that at least a part of the plural carbon fibers extended from one granular part is linked with another granular part;

wherein mean length of carbon fibers which link two granular parts together is of 3.0-20.0 μm, and wherein a coefficient of variation, CV, ((standard deviation/mean value)×100) which is obtained on a determination of outer diameter distribution of the carbon fibers which constitute the aggregator of carbon fiber is not more than 30%.

The present invention also provides the above mentioned carbon fibrous aggregator wherein coefficient of variations, CVs of outer diameter distribution of carbon fibers in (A) the range of from not less than 5 nm to not more than 45 nm, (B) the range of from not less than 5 nm to not more than 75 nm, (C) the range of from not less than 30 nm to not more than 120 nm, (D) the range of from not less than 40 nm to not more than 300 nm, and (E) the range of from not less than 60 nm to not more than 300 nm, are not more than 30%, respectively.

The present invention also provides the above mentioned carbon fibrous aggregator, wherein, the mean outer diameter of all the fibers used as standard data, the number of carbon fibers of which individual outer diameter is out of the range of ±50% variation from the mean outer diameter is not more than 12% of the total number of the carbon fibers.

The present invention also provides the above mentioned carbon fibrous aggregator, wherein two or more of units are continued, wherein each unit has a construction that carbon fibers are extended from a certain granular part as base point, these extended carbon fiber are linked with another granular part, and other carbon fibers are extended from the another granular part.

The present invention also provides the above mentioned carbon fibrous aggregator, wherein at the extended parts from their respective granular parts, carbon fibers are linked mutually with carbonaceous material at least partially, and wherein the sizes of granular parts are larger than the outside diameter of the carbon fibers.

The present invention also provides the above mentioned carbon fibrous aggregator, wherein the ratio of the mean diameter of the granular parts to the mean outer diameter of the carbon fibers are in the range of 3.0-11.0.

The present invention also provides the above mentioned carbon fibrous aggregator, wherein at least three carbon fibers are extended from each granular part.

The present invention also provides the above mentioned carbon fibrous aggregator which has an $I_D/I_G$ ratio of not more than 0.2, which is determined by Raman spectroscopy.

Furthermore, the present invention provides the above mentioned carbon fibrous aggregator which has an area-based circle-equivalent mean diameter of 20-150 μm, and a powder electric resistance, determined under a pressed density of the carbon fibrous aggregators, 0.8 g/cm$^3$, of not more than 0.030 Ω·cm.

Further, the present invention provides the above mentioned carbon fibrous aggregator which has a specific surface of 10-60 m$^2$/g.

Further, the present invention provides the above mentioned carbon fibrous aggregator which has a combustion initiation temperature in air of 700-900° C.

Still further, the present invention provides the above mentioned carbon fibrous aggregator which is produced using a reaction system which comprises a reaction furnace and a raw material introducing nozzle connected to the furnace, wherein a distributing and buffering board is provided around the raw material introducing nozzle at a heated temperature zone of 400-900° C. in the furnace.

Further more, the present invention provides the above mentioned carbon fibrous aggregator which is produced using the reaction system, wherein a cooling device is further provided at a position of contacting to the raw material introducing nozzle.

The present invention is also a composite material which comprises a matrix and the carbon fibrous aggregators, wherein an amount of the carbon fibrous aggregator added to the matrix is in a range of 0.1 to 50.0% by weight based on a total weight of the composite material.

The present invention further discloses the composite material of which the matrix comprises at least an organic material.

The present invention also discloses the composite material of which the matrix comprises at least an inorganic material.

The present invention also discloses the composite material of which the matrix comprises at least a metal.

The present invention also discloses the composite material which further comprise at least one kind of filling agent selected from the group which consists of metallic minute particle, silica, calcium carbonate, magnesium carbonate, carbon black, glass fibers and carbon fibers other than the above mentioned carbon fibrous aggregator in the matrix.

Effects of the Invention

According to the present invention, since individual carbon fibrous aggregator has plural granular parts, each of the granular parts being a base point for plural carbon fibers which are mutually independently extended outwardly from the base point and show a three dimensional expansion in all, and thus carbon fibers of 5-300 nm in outer diameter are bound together by their respective granular parts produced in a growth process of the carbon fibers so that the concerned plural carbon fibers extend outwardly from the granular part, the carbon fibrous aggregators can disperse promptly into a matrix such as a resin upon adding while maintaining their bulky structure. Even when they are added at a small amount to a matrix, they can be distributed uniformly over the matrix.

Further, since the outside diameters of the carbon fibers show a sharp distribution, the carbon fibrous aggregators can be utilized as an additive, particularly, additive for injection molding of resin, which is able to provide a dispersion of giving a uniform electrical conductivity throughout the surface and interior regions of the composite material, or as an additive which contribute stably various physical properties of the injection molded product. For instance, the aggregators are able to use for forming a composition material which exhibits a narrow range of variation in the electrical conductivity.

BRIEF DESCRIPTION OF THE DRAWINGS

FIG. 3 is a view which illustrates schematically the flow of raw material which is injected from an introducing nozzle which does not have a distributing and buffering board or the like.

FIG. 4 is a view which illustrates schematically the flow of raw material which is injected from an introducing nozzle which has a distributing and buffering board or the like.

BEST MODE FOR CARRYING OUT THE INVENTION

Figure 1:
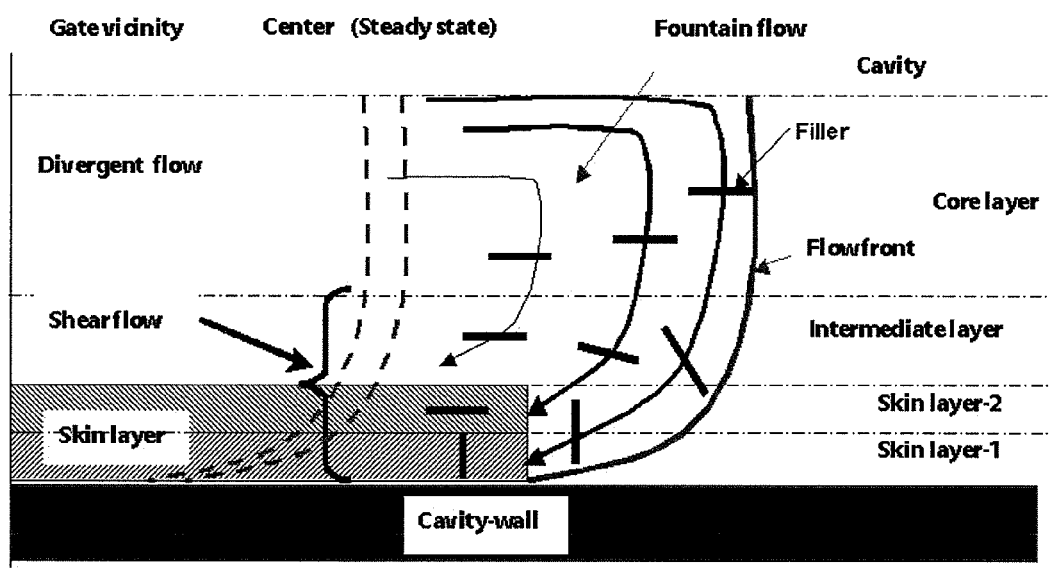
FIG. 1 is a view which illustrates schematically fountain flow in the injection molding.

Now, the present invention will be described in detail with reference to some embodiments.

Carbon fibrous aggregator according to the present invention is, as shown in SEM photos of FIGS. 12-21, a three dimensional network structure's aggregator of carbon fibers each having an outside diameter of 5-300 nm. Further, the carbon fibrous aggregator has plural granular parts, and plural carbon fibers are mutually independently extended outwardly from their respective granular parts so that each granular part is associated with two or more of carbon fibers, and the carbon fibers show a three dimensional expansion in all. In addition, the carbon fibrous aggregator shows a three dimensional network structure of the carbon fibers at least in a part by a state that at least a part of the plural carbon fibers extended from one granular part is linked with another granular part. The particle diameter of the granular part which binds the carbon fibers mutually (shown in FIGS. 12, 14, 16, 18 and 20) is larger than the outer diameters of the carbon fibers. The granular parts are formed during the growing process where a part of carbonaceous material is grown in the circumferential direction around the catalyst particles while other part of carbonaceous material is grown as fibrous structure by using at least two carbon compounds which have different decomposition temperatures as carbon source, and utilizing the difference in activity of metallic catalyst particles as mentioned later, etc.

The reason for restricting the outer diameter of the carbon fibers to a range of from 5 nm to 300 nm is because when the outer diameter is less than 5 nm, the amount of carbon fibers which are able to be produced from a certain amount of the raw material will become lower, and thus the production will become inefficient. On the other hand, when the outer diameter is more than 300 nm, the number of the carbon fibers per a unit amount becomes extremely low, and thus it becomes impossible to obtain a composite material having a high electrical conductivity by a small additive amount.

Further, the carbon fibrous aggregator according to the present invention has plural granular parts in a spatial space that is occupied by the carbon fibrous aggregator, each of the granular parts being a base point for plural numbers of carbon fibers which have the prescribed outer diameter as mentioned above and which are extended outwardly from the base point with a three dimensional expansion. Here, a spatial configuration which consists of one granular part and plural carbon fibers which are elongated from the granular part is called a "unit" in this specification. These carbon fibers in the unit are bound together by a granular part produced in a growth process of the carbon fibers so that the carbon fibers are externally elongated from the granular part. Since plural carbon fibers are not only entangled with each other, but strongly fixed together at the granular part, the carbon fibers will not disperse as single fibers, but will be dispersed as bulky carbon fibrous structures when added to a matrix such as a resin. Further, since the carbon fibers are bound together by the granular part produced in the growth process of the carbon fibers in the carbon fibrous aggregator according to the present invention, the carbon fibrous aggregator itself can enjoy superior properties such as electric property. For instance, when measuring electrical resistance under a certain pressed density, carbon fibrous aggregators according to the present invention have an extremely low resistivity, as compared with that of a simple entanglements of the carbon fibers or that of the carbon fibrous structures in which the carbon fibers are fixed at contacting points with carbonaceous material or carbonized substance therefrom after the synthesis of the carbon fibers. Thus, when carbon fibrous aggregators according to the present invention are added and distributed in a matrix, they can form good conductive paths within the matrix.

Further, with respect to the carbon fibers, the condition of being "extended outwardly" from the granular part used in this specification, means principally that the carbon fibers and granular part are linked together by carbon crystalline structural bonds as mentioned above, i.e., that the granular part shares the same graphene sheets of multilayered structure with the carbon fibers, but does not means that they are apparently combined together by any additional binding agent (involving carbonaceous ones).

Furthermore, it is preferable that the mean diameter of the granular parts is larger than the outside diameter of the carbon fibers as shown in Table 8, although it is not particularly limited thereto. When the granular part, which is the binding site of the carbon fibers, has a much larger particle diameter than the outer diameter of the carbon fibers, the carbon fibers that are externally elongated from the granular part sustained with a stronger binding force. Thus, even when the carbon fibrous aggregators are exposed to a relatively high shear stress during combining with a matrix such as resin, they can be dispersed in the matrix as maintaining their structures with showing three-dimensional expansion of having their respective plural granular parts each of which carbon fibers are elongated. As it is known from Table 8, in the present invention, it is preferable that the ratio of the mean diameter of the granular parts of the carbon fibrous aggregator to the mean outer diameter of the carbon fibers are in the range of 3.0-11.0.

In addition, with respect to the carbon fibrous aggregator according to the present invention, it is preferable that the carbon fibrous aggregator has an area-based circle-equivalent mean diameter of about 20-150 μm as shown in Table 9. The "area-based circle-equivalent mean diameter" used herein is the value which is determined by taking a picture for the outside shapes of the carbon fibrous aggregators with a suitable electron microscope, etc., tracing the contours of the respective carbon fibrous aggregators in the obtained picture using a suitable image analysis software, e.g., WinRoof™ (Mitani Corp.), and measuring the area within each individual contour, calculating the circle-equivalent mean diameter of each individual carbon fibrous aggregator, and then, averaging the calculated data.

Although it is not to be applicable in all cases because the circle-equivalent mean diameter may be affected by the kind of matrix material, e.g. a resin, to be complexed, the circle-equivalent mean diameter may become a factor by which the maximum length of a carbon fibrous aggregator upon combining into a matrix such as a resin is determined. In general, when the circle-equivalent mean diameter is not more than 20 μm, the electrical conductivity of the obtained composite may be expected to reach an insufficient level, while when it exceeds 150 μm, an undesirable increase in viscosity may be expected to happen upon kneading of the carbon fibrous aggregators in the matrix. The increase in viscosity may be followed by failure of dispersion or may result in an inferior moldability.

Furthermore, the carbon fibrous aggregator according to the present invention exhibits a bulky, loose form in which the carbon fibers are sparsely dispersed, because the carbon fibrous structure is comprised of plural granular parts and carbon fibers that are bound together by each of the granular parts so that the carbon fibers are externally elongated from each of the granular part as mentioned above. It is desirable that the bulk density of the carbon fibrous aggregator is in the range of 0.001-0.050 g/cm$^3$, more preferably, 0.001-0.020 g/cm$^3$. When the bulk density exceeds 0.050 g/cm$^3$, the improvement of the physical properties in a matrix such as a resin would become difficult with a small dosage of the carbon fibrous aggregators added to the matrix.

Furthermore, the carbon fibrous aggregator according to the present invention can enjoy good electric properties in itself, since the carbon fibrous aggregator has plural granular parts in a spatial space that is occupied by the carbon fibrous aggregator, and the plural numbers of carbon fibers in the spatial space are bound together by each of the granular parts which are produced in the growth process of the carbon fibers as mentioned above. For instance, it is desirable that a carbon fibrous aggregator according to the present invention has a powder electrical resistance determined under a constant pressed density, 0.8 g/cm$^3$, of not more than 0.030 Ω·cm, more preferably, 0.001 to 0.0200 Ω·cm. If the powder electrical resistance exceeds 0.030 Ω·cm, it may become difficult to form good electrically conductive paths when the carbon fibrous aggregators are added to a matrix such as a resin.

In order to enhance the strength and electrical conductivity of a carbon fibrous aggregator according to the present invention, it is desirable that the graphene sheets that make up the carbon fibers of the aggregator have a small number of defects, and more specifically, for example, the $I_D/I_G$ ratio of the carbon fibers determined by Raman spectroscopy is not more than 0.2, more preferably, not more than 0.1. Here, in the Raman spectroscopic analysis, with respect to a large single crystal graphite, only the peak (G band) at 1580 cm$^{-1}$ appears. When the crystals are of finite ultrafine sizes or have any lattice defects, the peak (D band) at 1360 cm$^{-1}$ can appear. Therefore, when the intensity ratio ($R=I_{1360}/I_{1580}=I_D/I_G$) of the D band and the G band is below the selected range as mentioned above, it is reasonable to say that there is little defect in graphene sheets.

Furthermore, it is desirable that the carbon fibrous aggregator according to the present invention has a combustion initiation temperature in air of not less than 700° C., preferably, 750° C.-900° C. Such a high thermal stability would be brought about by the above mentioned facts that it has little defects and that the carbon fibers have a predetermined outer diameter.

Further, it is preferable that the carbon fibrous aggregator according to the present invention has a specific surface of 10-60 m$^2$/g. When the specific surface exceeds 60 m$^2$/g, the outer diameters of the carbon fibers would become thinner, and the dispersion of the aggregators to the matrix or the like would become difficult. On the contrary, when the specific surface is less than 10 m$^2$/g, it becomes hardly possible to obtain a composite material of high electrical conductivity by adding a small dosage of the carbon fibrous aggregators added to the matrix.

The carbon fibrous aggregator according to the present invention has a superior characteristic that it makes the control of the skin layer on the injection molding easier. Further, the electrical conductivity of the resin molded article greatly depends upon the presence or not of the skin layer and the thickness thereof.

The "skin layer" used herein denotes the region of from 0 to several ten cm in thickness from the outer surface of a molded article which is manufactured by injection molding the mixture of a resin and carbon fibers. When degression in the concentration of carbon fibers, alignment of carbon fibers, and/or uneven dispersion of carbon fibers are caused in this region, the electrical conductivity at the outer surface of the molded article tends to become worse as compared with that at the central (core part) of the molded article.

"To make the control of the skin layer easier" used herein means that the difference of the electrical conductivities between the outer surface and the central part can be reduced. Because, the dispersion of the carbon fibers in the resin can become uniform with ease, when carbon fibers having a sharp distribution of their outer diameters are used.

Here, the "injection molding" used herein means the processing method of forming a molded article with a prescribed shape and size wherein a fluid material in the form of fluid or fluidized state is inserted into a die, next, the temperature is varied so as to solidify the fluid material, and then the solidified material is taken out from the die. The "injection molding" used herein, however, also involves cases where a certain harder material such as slurry, creamy material, or clayey material is injected into a die under a prescribed pressure and then extruded from the die to outside.

According to the conventional injection molding techniques, since a molten resin is injected into a static cavity, there is a fundamental problem that distortion due to the production method occurs. The distortion is particularly due to the alignment of carbon fibers, the uneven dispersion of carbon fibers, etc. When the molten resin is injected into the cavity, the filler, such as carbon fibers, tends to be aligned along the flow direction of the molten resin, and the segregation of the concentration of the fibers in the resin is caused. Thereby, the distortion is caused.

The orientated distortion is caused by flow of the resin in the cavity as shown in FIG. 1, and such flow is generally called "fountain flow". The orientated distortion is closely related to the fountain flow.

The fountain flow means the flow of resin for the injection molding, wherein the resin flows as approximate laminar flow in the cavity except the flow front of the fountain flow; when the resin comes into contact with the cooled surface of the die, a solidified layer is formed at the boundary surface; a next charged portion of resin flows ahead while flowing inside of the solidified layer; and after the next charged portion of resin reaches the top of the resin flow, it goes toward the surface of the die. In the techniques of the prior art, the resin which comes into contact with the surface of the die by the flow in accordance with the fountain flow is quickly cooled by the die, and thus a skin layer which includes no filler substantially is formed. Therefore, it is hardly possible to form a skin layer which has filler being equal in amount to the filler included in the core part substantially. Further, the control of the skin layer is difficult, because the fibers in the resin tend to disperse unevenly.

When the distribution of the outer diameters of fibers is broad, with respect to the force acting against the fiber due to the resin flow and the friction force in the molten resin, those forces given against the nearly thinnest fibers is dissimilar to those forces given against the nearly thickest fibers, even at the same place in the molten resin. Therefore, difference in rotation speed of the fiber arises. As a result, difference in rotating angle of the fiber and difference in traveling speed of the fiber arise, and which results in an uneven dispersion of fibers in the injection molded article.

The carbon fibrous aggregator according to the present invention can control the skin layer even on the ordinal injection molding method. Because the carbon fibers in the aggregator according to the present invention show a characteristic of having a narrow distribution of their outer diameters and thus as the reason mentioned above, it is possible to reduce the problem in the formation of the skin layer on the injection molding. In addition, because the carbon fibrous aggregator according to the present invention can maintain its stereological configuration of the fibers due to the granular parts in the occupying space, the problem of monotonous orientation of the fibers is also able to be improved.

In order to control the skin layer, it is preferable to regulate the injection molding rate with reference to the kind of resin to be used and the mean outer diameter of the fibers in the aggregators to be used. A desirable injection rate is in the range of 10 cm$^3$/sec-100 cm$^3$/sec, more preferably, in the range of 40 cm$^3$/sec-70 cm$^3$/sec.

Further, pulverization or disintegration is undergone so as to have a proper size of the carbon fibrous aggregators according to the fountain flow front rate of the molten resin or the size of the cavity.

Here, the "narrow range of variation" used herein denotes that data of the electrical conductivity or various mechanical properties are involved in the range of the mean value ±50%, wherein the data are determined at any five points inside of an area which is at a distance of more than 5 mm from every directions' peripheral edges of an article, wherein the article has an area of not less than 10 cm$^2$, and is made of the resin composite material into which carbon fibers are added. Namely, it means that the value of ([the maximum value(or minimum value)–the mean value]/the mean value)×100% is not more than ±50%.

The "carbon fibrous aggregator" used herein denotes plural number (more than three) of carbon fibers are gathered within a prescribed space by at least more than one of granular parts (shown in FIG. 11 to FIG. 17). These carbon fibers may be in contact with each other partially. Thus, it does not mean that a mere agglomerate of the carbon fibers is formed.

The "elongation with showing a three dimensional expansion" used herein means that plural number of carbon fibers are mutually independently extended outwardly from one granular part, and the configuration of the outward extensions is a configuration that plural number of carbon fibers are elongated within a three dimensional space with the granular part as the base point. In this configuration, at least a part of carbon fibers are linked mutually by carbonaceous material at their parts extended from their respective granular parts. The carbonaceous material can be improved in its crystallinity by undergoing annealing treatment at a high temperature.

The "distance between two granular parts" used herein denotes the length of carbon fiber which joints a granular part from which this carbon fiber is elongated with another adjacent granular part.

The "coefficient of variation, CV" used herein denotes the value of (the standard deviation of distribution of outer diameters of carbon fibers)/(mean value of outer diameters of carbon fibers). Here, on the calculations of the standard deviation and the mean outer diameter, it is preferable to take pictures of carbon fibers by SEM at a magnification of from ×35,000 to ×50,000, for three or more fields, and then, measure outer diameters of randomly selected two hundreds or more pieces of carbon fibers on the pictures, and use the values calculated therefrom.

The "number of carbon fibers of which individual outer diameter is out of the range of ±50% variation from the mean outer diameter is not more than 12% of the total number of the carbon fibers" used herein means that, for example, if the mean outer diameter of the carbon fibers in the aggregators which are manufactured during the same reaction is 100 nm the sum of the number of carbon fibers which have an outer diameter of less than 50 nm and the number of carbon fibers which have an outer diameter of more than 150 nm is not more than 12% of the total number of the carbon fibers. Namely, the carbon fibrous aggregators which are manufactured according to the present invention is characterized in that there is very small number for both of carbon fibers having extremely thick outer diameter and having extremely thin outer diameter as compared with the mean outer diameter.

Here, the distance between adjacent two granular parts is determined by measuring distance from the center of a granular part to the center of another granular part which is adjacent the former one. When the mean distance between the granular parts is not more than 0.5 μm, an aggregator which is formed by such carbon fibers shows an inadequately elongated configuration because the lengths of the carbon fiber are not enough. Therefore, it may become difficult to form good electric conductive paths when such carbon fibrous aggregators are added and dispersed to a matrix. Meanwhile, when the mean distance exceeds 100 μm, the aggregators which is formed by such carbon fibers becomes a relatively large aggregator of the carbon fibers, and thus, undesirable increase in viscosity may be expected to happen upon adding and dispersing the carbon fibrous aggregators in the matrix. The increase in viscosity may result in an inferior dispersibility of the carbon fibrous aggregators into the matrix. As a desirable mean distance between granular parts may be, for example, 2.0-50.0 μm, more preferably, 3.0-20.0 μm.

The carbon fibrous aggregators according to the present invention having the above described, desirable configuration may be prepared as follows, although it is not limited thereto.

Basically, an organic compound such as a hydrocarbon is chemical thermally decomposed through the CVD process in the presence of ultrafine particles of a transition metal as a catalyst in order to obtain fibrous aggregators (hereinafter referred to as an "intermediate"), and then the obtained intermediate undergoes a high temperature heating treatment.

In order to obtain carbon fibrous aggregators having a sharp distribution of outer diameters of fibers, the following technical methods are adopted.

By adjusting the concentrations of the raw organic compound and the catalyst with the flow rate of the carrier gas, hydrogen, fibers which have a desirable mean diameter can be obtained. We, the inventors, however, have focused our attention on the gas flow in the reaction furnace, the uniformity of the temperature of the growing region for catalyst transition metal, etc.

Although some important aspects for manufacturing carbon fibrous aggregators having a sharp distribution of outer diameters of fibers are exemplified below, the present invention is not limited thereto:

1) Uniformity of hydrocarbon and catalyst metal in the furnace
2) Uniformity of metal catalyst particles' size
3) Control of charging rate of raw material
4) Controlling method for gradually expanding the raw material just after it have been introduced into the reaction furnace
5) Controlling the timing for starting the reaction of hydrocarbon with metal catalyst in the reaction furnace
  (Controlling of the Position for Starting the Carbon Fibers' Formation in the Reaction Furnace)
6) System constitution for contributing a turbulent flow easily at introducing region of the raw material in the reaction furnace, i.e., the growing region of the catalyst In order to satisfy the above mentioned conditions, the manufacturing of the carbon fibrous aggregators may be performed using a reaction system mentioned below.

Figure 2:
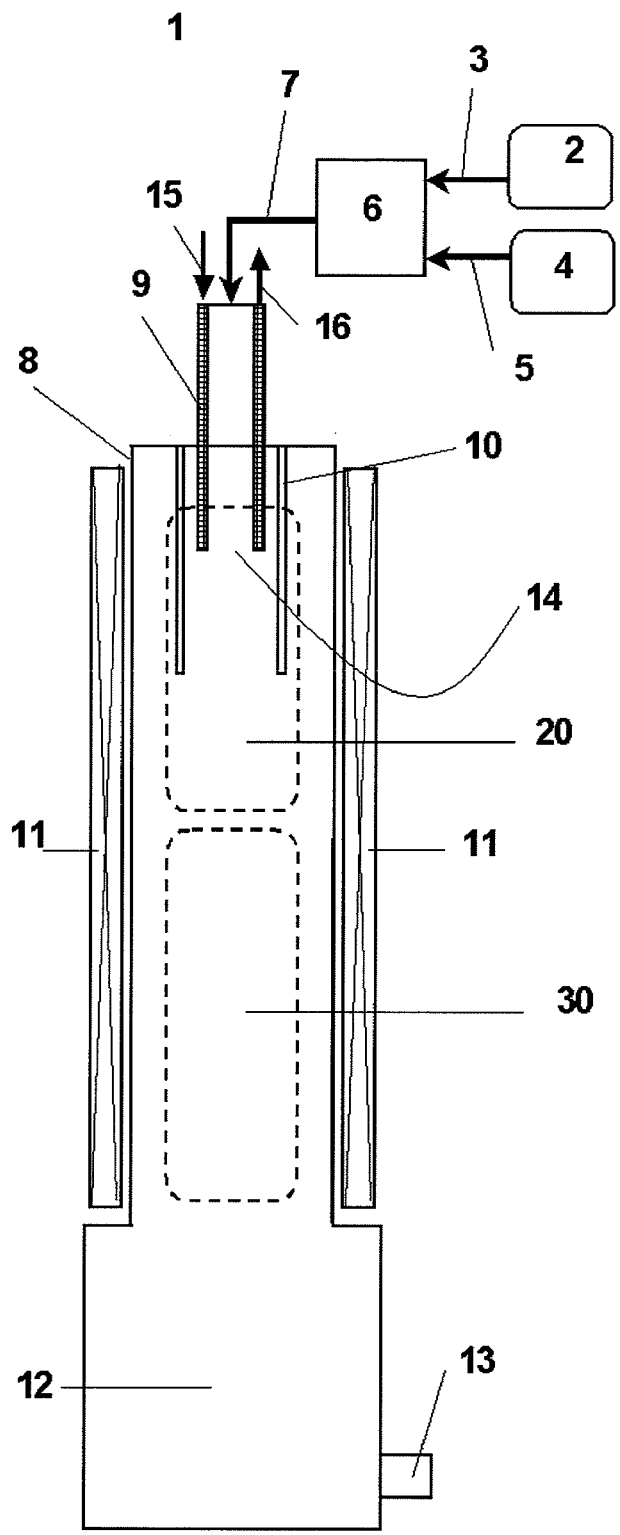
FIG. 2 is a view which illustrates schematically construction of the carbon fiber manufacturing system in an embodiment according to the present invention.

A manufacturing system 1 shown in FIG. 2 is the system of manufacturing carbon fibrous aggregators wherein a raw material is evaporated, the gasified raw material is mixed with a carrier gas, and the obtained raw material mixture gas is introduced into a reaction furnace 8, and the carbon fibrous aggregators are manufactured in the reaction furnace 8.

The manufacturing system 1 is equipped with a raw material tank 2 into which the raw material is filled, and a gas tank 4 into which a carrier gas is filled, the carrier gas being used for transferring the raw material and introducing the raw material into the reaction furnace 8. The raw material tank 2 and the gas tank 4 are connected to an evaporator 6 through a raw material introducing tube 3 and a gas introducing tube 5, respectively. Further, the evaporator 6 is connected to the reaction furnace 8 through a raw material mixture gas introducing tube 7.

The reaction furnace 8 in which the carbon fibers are manufactured is shaped cylindrically, and the reaction furnace 8 is equipped with an inlet nozzle 9 at it's upper end, i.e., one end in the axial direction of the furnace, in order to introduce the transferred raw material mixture gas into the reaction furnace. Further, a heater as a heating means 11 is provided around the outer peripheral part of the reaction furnace, and thereby, the interior of the reaction furnace 8 is heated from the outer peripheral part. At the lower end, i.e., another end in the axial direction of the furnace, a carbon fiber collecting chamber 12 is connected, which stocks the carbon fibers manufactured in the furnace and collects the carbon fibers. Further, a gas exhaust tube 13 for exhausting the gas is connected to the carbon fiber collecting chamber 12.

In this carbon fiber manufacturing system 1, as the raw material for the carbon fibers, hydrocarbon compound, metal compound, etc., are used. As hydrocarbon compound, aromatic hydrocarbons, chain saturated hydrocarbons, alicyclic hydrocarbons, unsaturated hydrocarbons, etc., are usable. Among these hydrocarbon compounds, aromatic hydrocarbons such as benzene, toluene, are preferable. It is also possible to use at least two different kinds of hydrocarbon compounds as the raw material at the same time. As the metal compound, one which can be vaporized by heating is preferable, although it is not limited thereto. As the kind of the metal species included in the metal compound, there is no particular limitation, and the metal species can be selected appropriately. For instance, Fe, Co, Ni, Cu, No and so on can be exemplified. Further, a sulfur compound as a promoter (co-catalyst) can be used together on an occasionally demand.

As the carrier gas which is used on the manufacturing of the carbon fibers, a rare gas such as argon or helium; hydrogen, nitrogen, or the like can be used. Among these carrier gases, hydrogen gas is desirable because it can enhance the yield of the fibers.

The hydrocarbon and the raw material as a source of the metal catalyst are adequately stirred with the aid of the evaporator 6 in order to obtain a fully mixed state of the hydrocarbon gas and the precursor gas which will give atoms of the metal catalyst. Further, the mixture gas is maintained under heating in order to improve the uniformity of the mixing state of the raw materials in the reaction furnace.

The evaporator 6 to which these raw materials and the carrier gas are introduced functions so as to vaporize the raw materials before the raw materials are introduced into the reaction furnace, and to regulate the gas concentration ratio of the raw materials (ratio of the hydrocarbon to the metal catalyst) to a constant value. Therefore, the raw materials continuously sent out from the raw material tank 2 and the carrier gas continuously sent out from the carrier gas tank 4 are mixed together in the evaporator 6, and thus, a raw material mixture gas which has a constant gas concentration ratio is produced. The obtained raw material mixture gas is then continuously transferred from the evaporator 6 toward the reaction furnace 8, and introduced into the interior of the reaction furnace 8. On this occasion, since the evaporator 6 can make the concentration ratio of the raw material mixture gas into a constant value invariably, it is possible to prevent the distribution of the outer diameters of carbon fibers in the aggregators from broadening. A factor which plays a role in broadening the distribution is the nonuniformity for the concentrations of the raw materials or the like at the time when they are introduced into the reaction furnace 8. A stirring device such as a propeller may be provided inside the evaporator 6, and a heating device which is able to hold the temperature at 350-450° C. may be provided to the evaporator 6. By virtue of these devices, the vaporized hydrocarbon gas and the gas which will give the metal catalyst are mixed together uniformly. As described above, the raw material mixture gas is introduced into the reaction furnace, while the concentration of the raw material mixture gas is kept invariably at a prescribed constant ratio.

The raw material mixture gas which was mixed and prepared by the evaporator 6 is introduced into the reaction furnace through the inlet nozzle 9 at an introduction rate of 1000-2000 NL/min, under a pressure of 1.0-1.1 atm.

The interior of the reaction furnace 8 into which the raw material mixture gas is introduced comprises two zones along the axial direction of the reaction furnace. In the axial direction of the reaction furnace, the upper side zone near the raw material mixture gas introducing port 14 is the metal catalyst particle producing zone 20 where metal catalyst particles which function as the catalyst are produced from the precursor gas, and the zone located at lower side than the metal catalyst particle producing zone 20 is the carbon fiber producing zone 30 where carbon fibers are produced.

The interior of the reaction furnace 8 into which the raw material mixture gas is introduced is heated by the heating means 11. The heating temperature is set to an appropriate temperature in consideration of the temperature suitable for producing the metal catalyst particles for manufacturing the carbon fibers, the temperature suitable for manufacturing the carbon fibers by the thermal decomposition of the hydrocarbon gas with thus produced metal catalyst particles, or the like. Concretely, for instance, the interior of the reaction furnace is heated to about 800-1300° C. Moreover, although the temperature of the interior of the reaction furnace 8 may be set at the same temperature within the range of about 800-1300° C. throughout the interior, it is also possible to provide a temperature gradient from the side of the inlet nozzle 9, from which the raw material mixture gas is introduced, to the side of collecting the carbon fibers. Alternatively, it is also possible to set two different temperatures by dividing the interior of the reaction furnace 8 into two temperature zones, for instance, an upper side zone and a lower side zone of the reaction furnace 8.

Since the reaction furnace ought to be heated to a high temperature, it is made of a refractory material, such as metal or ceramics, which is capable of resisting the manufacturing temperature of the carbon fiber. Particularly, as the material of the furnace, a ceramics material, such as sintered body of silicon carbide, which has a low porosity and a superior thermal conductivity is desirable.

Further, in the present invention, it is preferable to control the raw material so as to expand gradually just after it have introduced into the reaction furnace. According to the prior art's method, because the interior of the reaction furnace is set to a high temperature condition of not less than 800° C., at the instant when the raw materials are introduced into the reaction furnace, the hydrocarbon and the catalyst metal tend to react with each other before they are sufficiently diffused in the reaction furnace. Therefore, the hydrocarbon and the catalyst metal react with each other in an unfavorable ratio of them, and it is followed by unfavorable variations in the outer diameters of the carbon fibers in the aggregator.

In the present invention, an improvement is also made on the periphery portion of the introducing port of the inlet nozzle 9 (FIG. 5) in order to solve the above mentioned problem. When circulating a cooling gas or cooling air around the inlet nozzle 9, and providing a distributing and buffering board 10, an effect of buffering the abrupt change of temperature from the reaction furnace can be also gained. By virtue of these means, gradual rising of the temperature and gradual thermal expansion are attained, and therefore, it is possible to start the synthesis of the carbon fibrous aggregators under the condition that the raw materials are diffused uniformly into the reaction chamber.

Figure 3:
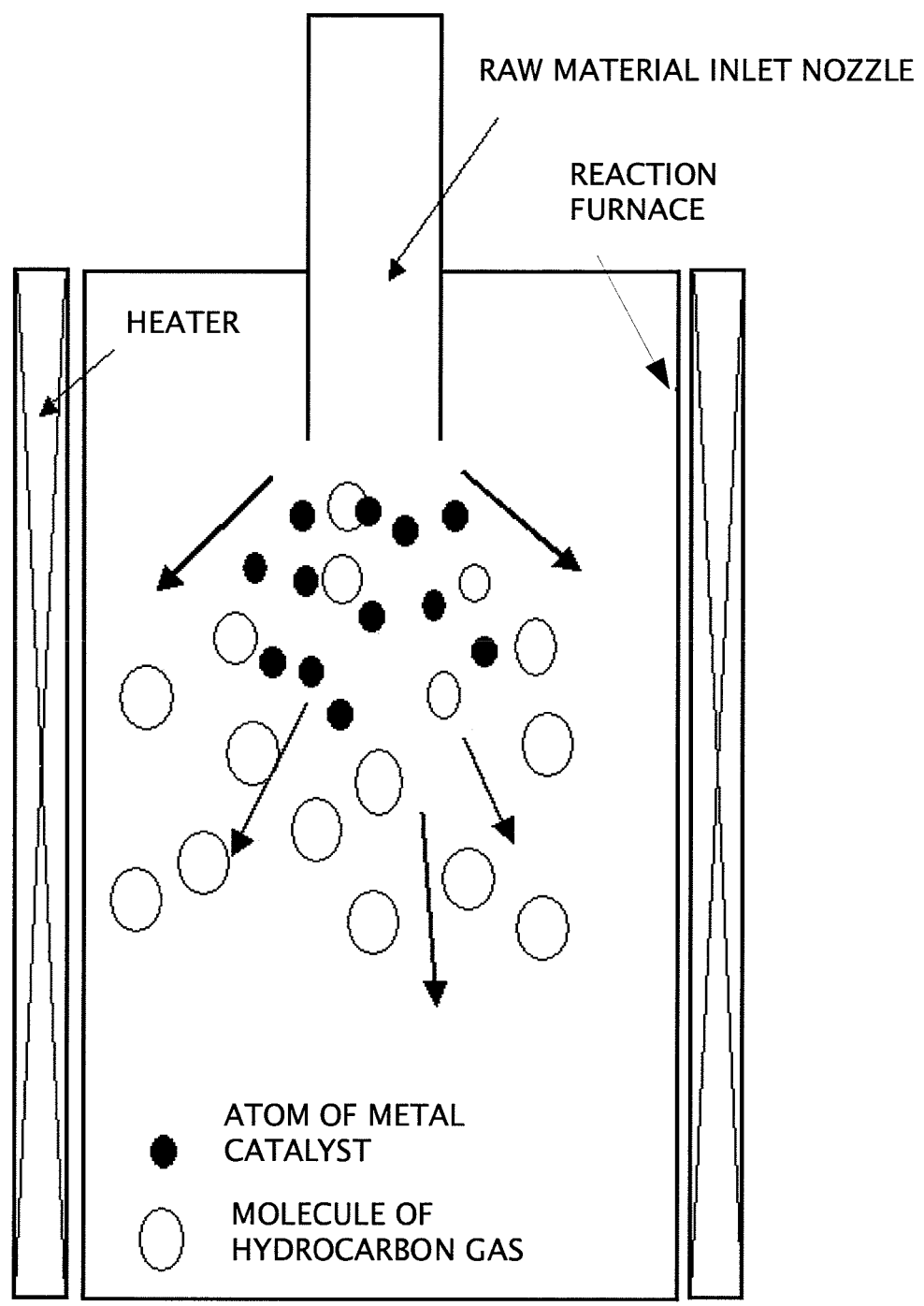

As shown in FIG. 3, when no device for controlling the temperature is provided at the periphery portion of the introducing port of the inlet nozzle 9, wherein the introducing port is the part of directly connecting to the reaction furnace, only the hydrocarbon is allowed to expand and diffuse abruptly into the reaction furnace. Since the metal catalyst which is produced from the precursor gas as the source of the metal catalyst is solid and has a low expansion coefficient, it does not expand and diffuse quickly. Thus, a state that the metal catalyst exists locally with a high concentration at the periphery portion of the introducing port of the inlet nozzle 9 is formed. This state is caused by the differences in the expansion coefficient and the gravity between the hydrocarbon gas and the metal catalyst. When the concentration of the metal catalyst is heightened locally, the atoms of the metal catalyst tend to come into collision with each other. Owing to this problem, the deviation for the sizes of the catalyst metal particles is frequently happened. Because the carbon fiber is generally grown utilizing the metal catalyst as nucleus on the chemical vapor phase growing method, the deviation for the outer diameters of the carbon fibers is also frequently caused when there is the deviation for the sizes of the catalyst metal particles utilized on the growth of carbon fiber.

Figure 4:
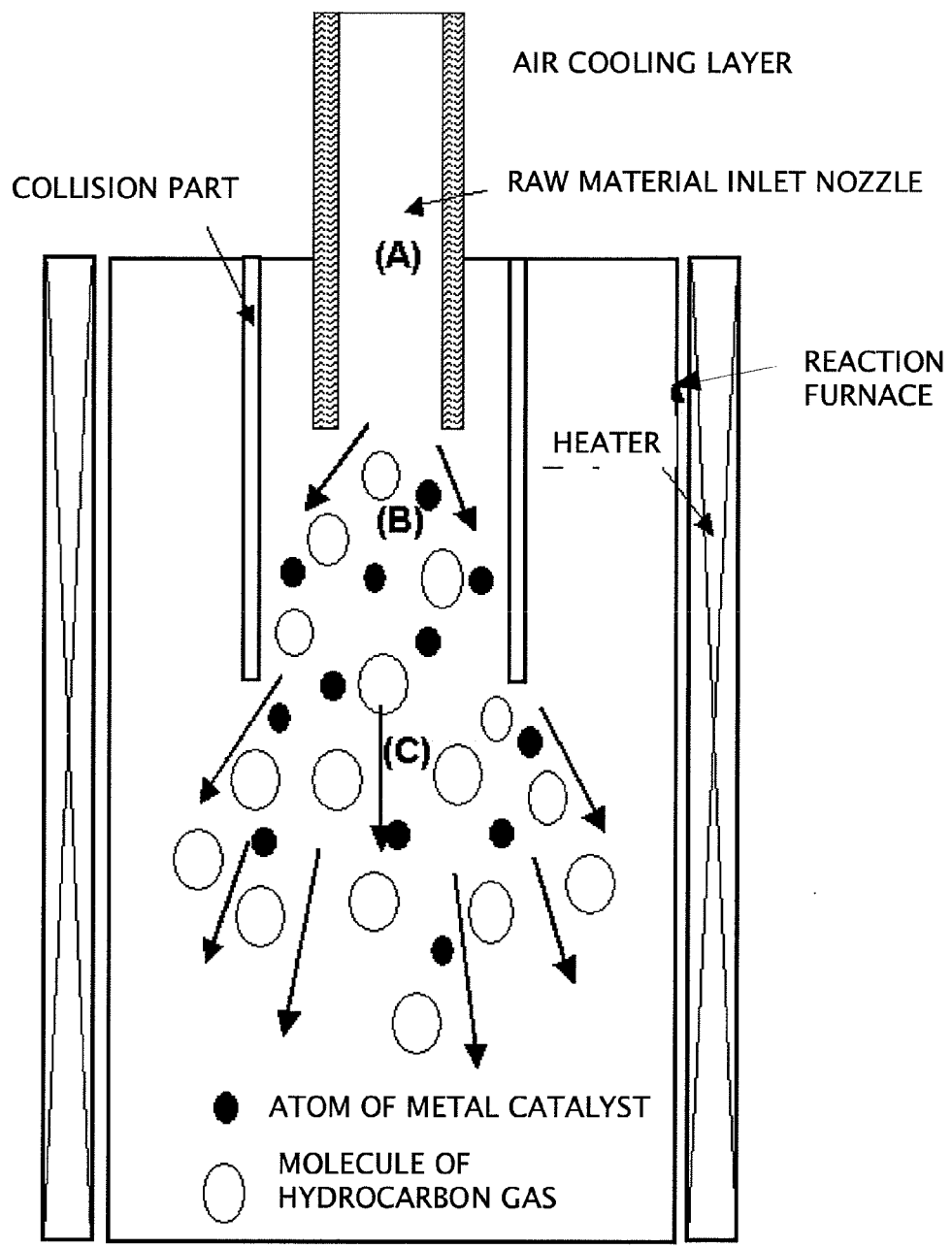

In the present invention, as shown in FIG. 4, it is preferable to provide a cooling device around the inlet nozzle 9 which is directly connected to the reaction furnace in order to control the temperature. The cooling device is set so as to surround the inlet nozzle 9 which is extended into the reaction furnace, and it has a shape like a cooling tube or cooling cylinder, and cooled air or cooled nitrogen gas may be fed into the interior of which.

With respect to the functions of the distributing and buffering board 10, not only the thermal buffering effect around the inlet nozzle 9, but also the gas distribution effect by which the raw material introduced from the inlet nozzle 9 is given a directional property of going downward are offered. Thus, the production system comes to have a construction capable of contributing a turbulent flow easily in the reaction furnace.

Incidentally, the "turbulent flow" used herein means an irregular flow generated in the reaction furnace, which is caused by the flow of the raw material gas and the temperature difference within the reaction furnace, and which is the flow with vortexes in the direction of vertical, horizontal and/or oblique.

In the manufacturing system 1, the distributing and buffering board is provided near to the raw material mixture gas introducing port 14 of the inlet nozzle 9, wherein the introducing port is settled in the reaction furnace 8. This distributing and buffering board also functions as a mean by which the raw material gas which is introduced from the inlet nozzle 9 into the reaction furnace 8 is converted from a laminar flow condition into a turbulent flow condition.

Here, the "distributing and buffering board" used herein denotes a board which surrounds the periphery portion of the inlet nozzle, and which has the function of distributing the raw material gas or the thermal buffering function.

The distributing and buffering board is an obstacle which functions as a base point of collision which interferes with the flow of the raw material mixture gas positioned at the periphery portion of the inlet nozzle 9. When the raw material mixture gas collides with the obstacle, vortex flows are generated, and thereby, the uniformity of the temperature distribution and the uniformity of the concentration distribution can be attained. The shape of the distributing and buffering board is not particularly limited, as far as the vortex flow which is initially generated at the distributing and buffering board as a starting point is formed successively until it reaches the lower end side of the reaction furnace without disappearing.

As an example of the shape of the distributing and buffering board, a shape like the distributing and buffering board 10 can be enumerated. The distributing and buffering board 10 is shaped cylindrically so as to surround the inlet nozzle 9 in the circumferential direction of the raw material mixture gas introducing port 14. As far as the "periphery portion of the inlet nozzle 9" used herein is surrounded by a configuration of that from the inlet nozzle 9 to the distributing and buffering board 10, the diameters are suddenly enlarged. A configuration where the distributing and buffering board 10 is formed continuously integrally with the opening end of the inlet nozzle 9 while the diameter suddenly enlarging may be also adaptable.

The inner diameter of the distributing and buffering board 10 is larger than the inner diameter of the inlet nozzle 9, and the distributing and buffering board 10 is designed so that the pathway of the raw material mixture gas is suddenly expanded. This sudden enlargement of the diameter can contribute a drastic variation of flow rate and a drastic differential pressure. In addition, the vortex flows are formed successively by collisions of the raw material mixture gas which is introduced from the inlet nozzle 9 and spreads outwardly in the radial direction with the distributing and buffering board 10.

Then, since the pathway of the raw material mixture gas is expanded from the inner diameter of the distributing and buffering board 10 to the inner diameter of the reaction furnace 8, a variation of flow rate and a differential pressure are also caused at this place. In addition, the inner wall of the reaction furnace functions as a collision wall. Thus, the vortex flow can be formed successively until it reaches the lower end side of the reaction furnace without disappearing.

Figure 5:
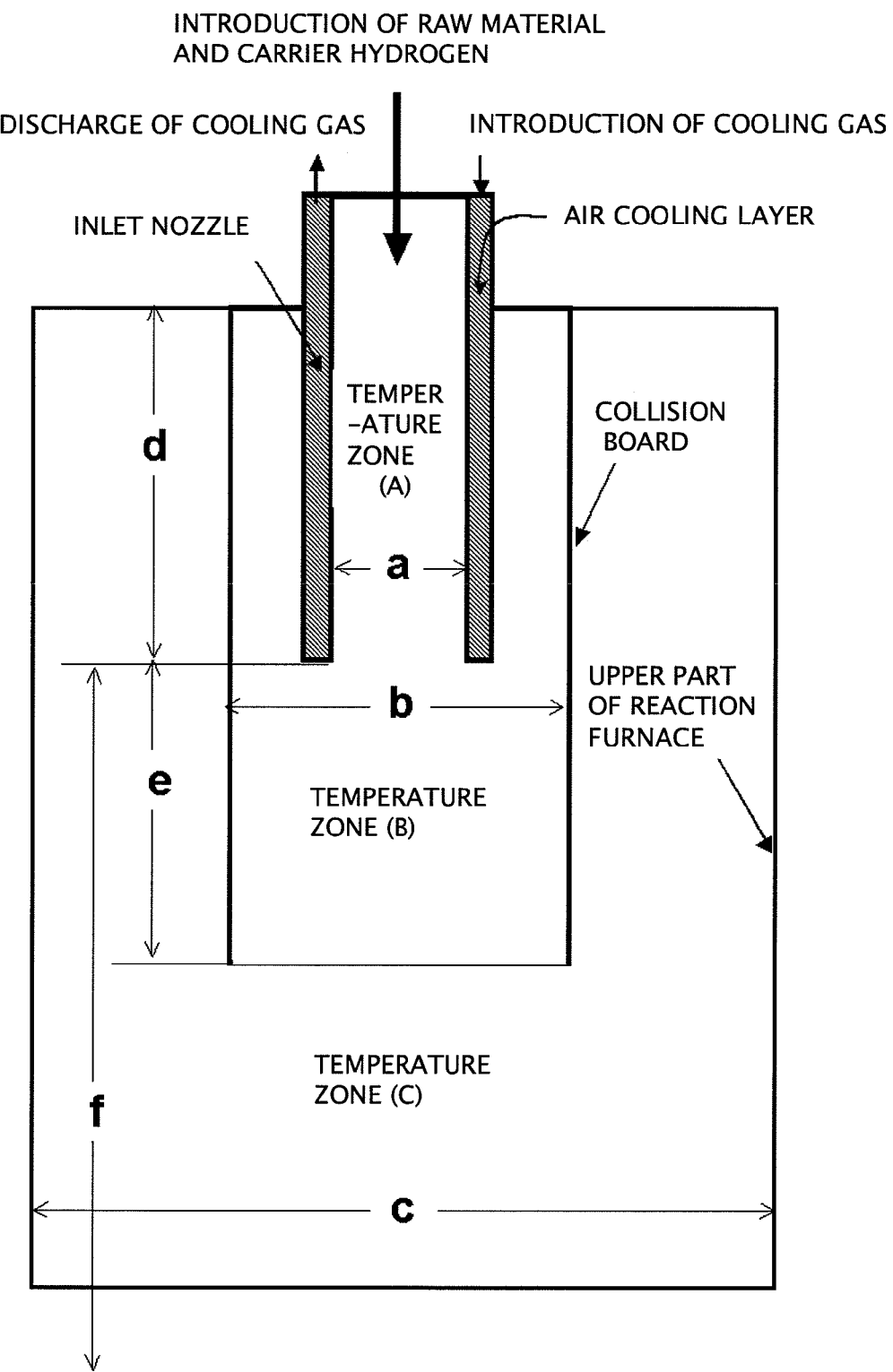
FIG. 5 is a view which illustrates schematically the introducing nozzle which has a distributing and buffering board and which is provided in the carbon fiber manufacturing system shown in FIG. 2.

As the inlet nozzle 9 which is equipped with the distributing and buffering board 10, for instance, the nozzle shown in FIG. 5 can be used. FIG. 5 illustrates the mutual positional relations of the reaction furnace 8, the inlet nozzle 9, and the distributing and buffering board 10, in the radial direction and the axial direction.

As shown in FIG. 5, the inner diameter of the inlet nozzle 9, the inner diameter of the cylindrical-shaped distributing and buffering board 10, the inner diameter of the reaction furnace 8, the distance from the upper end of the reaction furnace 8 to the raw material mixture gas introducing port 14, the distance from the raw material mixture gas introducing port 14 to the lower end of the distributing and buffering board 10, and the distance of from the raw material mixture gas introducing port 14 to the lower end of the reaction furnace 8 are called "a", "b", "c", "d", "e" and "f", respectively.

Regarding the sizes of the inner diameter a and the inner diameter b, when the size ratio of the inner diameter a and the inner diameter c, a:c, is set to be 1:2-1:5, the ratio a:b may be set to be 1:1.1-1:3.

Further, when the distance ratio of the distance d and the distance f is set to be 1:4-1:9, the distance ratio of the distance e and the distance d may be set to be 1:1.1-1:3.

For instance, when the inner diameter a, the inner diameter c, the distance d, and the distance f are designed to be 100 mm, 500 mm, 500 mm, and 2500 mm, respectively, the inner diameter b of the distributing and buffering board 10, and the distance e of from the raw material mixture gas introducing port 14 to the lower end of the distributing and buffering board 10 may be set to be 110 mm-300 mm, and 550 mm-1500 mm, respectively.

When the raw material mixture gas is introduced into the interior of the reaction furnace 8 with a gas supplying rate in the range of 1000-2000 NL/min under a pressure in the range of 1.0-1.1 atm and as far as the size relation among the reaction furnace 8, the inlet nozzle 9 and the distributing and buffering board 10 is set as mentioned above, the raw material mixture gas introduced from the inlet nozzle 9 can flow down to the lower end of the reaction furnace on condition that it continuously forms vortex flows with the aid of the distributing and buffering board 10 while it takes with the reaction of manufacturing carbon fibers.

Therefore, the raw material mixture gas just after it is introduced from the inlet nozzle into the reaction furnace spreads outwardly in the radial direction because variations in the flow rate and in the pressure are caused. Then, the raw material mixture gas comes into collision with the distributing and buffering board 10, and thereby it forms vigorous vortex flows, and it flows towards the collecting side of the carbon fibers while it forms the vortex flows continuously. The presence of the distributing and buffering board 10 acts as the starting point for forming the vortex flows on the introduction of the raw material mixture gas, and the vortex flows thus formed can have an effect on the acceleration of heat transmission and mass transfer.

Namely, the vigorous vortex flows can be changed into larger vortex flows as the pathway is further expanded up to the inner wall of the reaction furnace 8 and thus the variations in the flow rate and in the pressure are caused. Therefore, the raw material mixture gas can flow while maintaining the vortex form throughout its travel in the reaction furnace, instead of being rectified. In the reaction furnace, the carbon fibers are synthesized from the raw material mixture gas carried on the flows, and the carbon fibers being in synthesized and thus synthesized flow and pass in the interior of the reaction furnace 8 while they revolve by the vortex flow.

As a result, it is possible to make the manufacturing conditions in the reaction furnace 8 during the step of producing the metal catalyst particles and the step of synthesizing the carbon fibers uniform. More concretely, in the reaction furnace 8, the distribution of concentration of the introduced raw material mixture gas and the distribution of the temperature are made uniform in the directions perpendicular to the axial direction. By uniformizing the manufacturing conditions as mentioned above, the carbon fibers can be allowed to grow equally.

Simulations were performed according to the Computational Fluid Dynamics (CFD) model on a cylindrical reaction furnace for synthesizing the carbon fibers so as to calculate variations in phenomena, such as flows in the reaction furnace, mass transfer, temperature transmission and chemical changes, by altering variously the temperature, the introducing rate of the raw material mixture gas and the condition for the distributing and buffering board 10 with which the raw material mixture gas collides. With respect to the calculation model, the used model is that which comprise a vertical cylindrical reaction furnace equipped with a heater surrounding thereof and wherein toluene as the raw material and hydrogen gas as the carrier gas is introduced from an inlet nozzle 9 which is provided at the upper end of the reaction furnace, and an effluent gas is discharged through a gas exhaust tube which is provided at the lower end of the reaction furnace. With respect to the chemical reaction model, the calculation was performed also in consideration of the production of benzene by the reaction of toluene with hydrogen, the synthesis reaction of carbon fiber from benzene, and the synthesis reaction of Fe catalyst due to the thermal decomposition reaction of ferrocene.

According to such simulations, it is confirmed that the inlet nozzle 9 which has the distributing and buffering board 10 and which is provided in the manufacturing system for carbon fibers shown in FIG. 5 uniformizes the concentration distribution and temperature distribution of the raw material mixture gas which is introduced into the cylindrical reaction furnace in the directions perpendicular to the axial direction.

By using above mentioned manufacturing system 1, the carbon fibers are manufactured as follows.

A constant amount of the raw material is supplied from a raw material tank 2 to the evaporator 6, while a constant flow rate of the carrier gas is supplied from the gas tank 4 to the evaporator 6. The raw material thus supplied is vaporized in the evaporator 6, and is mixed with the carrier gas. On the mixing, the gas concentration ratio of the raw material and the carrier gas is controlled to a constant value.

Following the mixing of the raw material and the carrier gas in the evaporator 6, the raw material mixture gas thus obtained is induced to the upper end side of the reaction furnace 8 through the raw material mixture gas introducing tube 7. Then, it is introduced into the interior of the reaction furnace 8 via the inlet nozzle 9 which is provided at the upper end of the reaction furnace 8.

Since the restrictive diameter is changed just after the introduction, variations in the flow rate and in the pressure are caused with respect to the raw material mixture gas which is introduced into the reaction furnace. Thus, the flow of raw material mixture gas is disturbed, and the gas flows so as to spread outwardly in the radial direction. Then, the gas comes into collision with the distributing and buffering board 10 which is provided at the outside of the inlet nozzle 9, and the vortex flows of the raw material mixture gas are generated and the flow of the raw material mixture gas becomes in the state of the turbulent flow.

On the step for the generation of metal catalyst fine particles which is due to the decomposition of the metal compound included in the raw material mixture gas and which takes place just after the introduction of the raw material mixture gas to the interior of the reaction furnace 8, at first, the transition metal compound is decomposed to create metal atoms, then, plural number of, for example, about one hundred of metal atoms come into collisions with each other to create a cluster. At the created cluster state, it does not show crystallinity, and it can not function as a catalyst for the carbon fiber. Then, the clusters are further aggregated by collisions with each other to grow into a metal crystalline particle of about 5 nm-15 nm in the mean size, and which particle comes into use as the metal catalyst fine particle for producing the carbon fiber. During the catalyst formation process as mentioned above, because the vortex flows belonging to the vigorous turbulent flow are present, it is possible that the collisions of carbon atoms or collisions of clusters become more vigorously as compared with the collisions only due to the Brownian movement of atoms or clusters, and thus the collision frequency per unit time is enhanced so that the metal catalyst fine particles are produced within a shorter time and with higher efficiency. Further, since concentration, temperature, and etc. are homogenized by the force of vortex flows, the obtained metal catalyst fine particles become uniform in size.

Since the metal catalyst fine particles are obtained with a high yield, the carbon fibers which are synthesized by using the metal catalyst fine particles as their nuclei are also obtained with a high yield. Therefore, the recovering amount of unreacted raw material mixture gas which has not participated in the synthesis reaction of the carbon fibers can become lower. In addition, since the metal catalyst fine particles are generated rapidly, the out-of-time problem in demand for growth of the carbon fiber, per se, in the direction of length and the direction of thickness can be dissolved. Further, the decomposition of the hydrocarbon gas is also accelerated, and thus an ample amount of carbon source can be supplied. Thus, insufficient growth of the carbon fiber is hardly happened, and thus the aggregators each having carbon fibers of a desired fiber outer diameter and a desired fiber length can be obtained without causing variations in these dimensional factors.

Furthermore, when using the manufacturing system 1 of the carbon fibers and the manufacturing method according to this embodiment, a metal catalyst fine particles' cluster in which numerous metal crystalline particles were aggregated by vigorous collisions with the force of vortex flows can be formed during the step for producing the metal catalyst fine particles. It has been found that each carbon fiber grows from each individual metal catalyst fine particle in the aggregate by utilizing the metal catalyst fine particle as a nucleus, therefore, carbon fibers as a whole growing in a radial pattern, and thus, the carbon fibers being in a structure in which the carbon fibers are mutually bound via the nuclei as a relay point and thus electrically conductive pathways are developed are obtained with a high yield.

Since the carbon fibers each extended outwardly from the above mentioned each individual catalyst particle in the metal catalyst fine particles' aggregate (the aggregate is herein also called "reaction catalyst particle") utilize the catalyst particles as the growing nuclei, plural numbers of the carbon fibers are extended outwardly from one reaction catalyst particle. Further, it may be also considered that some of the metal catalyst fine particles in the reaction catalyst particle are ones that have a lower activity than the other metal catalyst fine particles or ones that are deactivated on the reaction. Such catalyst fine particles will allow carbonaceous material to grow in the circumferential direction before, during or after the formation of the aggregate, but not allow to grow as carbon fiber. Thus, the reaction catalyst particle comprises plural end parts of carbon fibers which are mutually independently extended outwardly, and plural metal catalyst fine particles from which carbonaceous material grown only in the circumferential direction. In many cases, the granular part which binds the carbon fibers together shows a shape of an aggregated or integrated configuration of plural sphere articles rather than a simple sphere shape. Further, since the growth of the carbonaceous material is continued under such an aggregated or integrated configuration, and this fact is in cooperation with the annealing treatment mentioned below, any adjacent members among the plural end parts of the carbon fibers and plural sphere articles which are aggregated or integrated in the granular part form and own jointly a continuous graphene sheet-like layer (or layers). As a result, a carbon fibrous aggregator wherein plural carbon fibers which are extended outwardly with a three dimensional expansion are mutually tightly fixed with the granular part(s) is generated.

Further, as mentioned above, by mixing the raw materials and heating them before they are thrown into the reaction furnace, by providing the cooling device and/or the distributing and buffering board 10 near the inlet nozzle 9, and so on, the control of the gradual temperature rising of the raw material and the optimized diffusion of the raw material can be attained, and thus, the production of the carbon fibrous aggregators which fibers have a sharp distribution of their outer diameter becomes possible.

Thereby, it becomes possible to provide the carbon fibrous aggregator which is able to be dispersed uniformly with ease, and which is able to control the skin layer on the injection molding, and which has a narrow distribution of physical properties such as electrical conductivity.

According to the present invention, it is possible to control the outer diameter distribution to become sharpened with one reaction. Thus, after the synthesis of the carbon fibers, there is no necessary to subject the obtained carbon fibers to such an operation which has been reported in JP 2006-265178 A and so on, and in which the carbon fibers are solubilized with a reagent, and then they are classified and separated severally according to their structure.

Although some important aspects for manufacturing the carbon fibrous aggregators which have a structure of being extended three-dimensionally are enumerated below, the present invention is not limited thereto:
1) Usage of at least two carbon compounds which have different decomposition temperatures
2) Crystal face selectivity of the catalyst particle
3) Residence time in the reaction furnace
4) Temperature distribution in the reaction furnace The thermal decomposition reaction of the hydrocarbon as a raw material mainly occurs on the surface of the catalyst particles or on growing surface of granular parts which each have grown around their respective catalyst particle as the nucleus, and the fibrous growth of carbon may be achieved when the recrystallization of the carbons generated by the decomposition progresses in a constant direction. When obtaining carbon fibrous aggregators according to the present invention, however, the balance between the thermal decomposition rate and the carbon fiber growth rate is intentionally varied. Namely, for instance, as mentioned above, to use as carbon sources at least two kinds of carbon compounds having different decomposition temperatures may allow the carbonaceous material to grow three dimensionally around the granular part as a centre, rather than in one dimensional direction. The three dimensional growth of the carbon fibers depends not only on the balance between the thermal decomposition rate and the growing rate, but also on the selectivity of the crystal face of the catalyst particle, residence time in the reaction furnace, temperature distribution in the furnace, etc. The balance between the decomposition rate and the growing rate is affected not only by the kinds of carbon sources mentioned above, but also by reaction temperatures, and gas temperatures, etc. Generally, when the growing rate is faster than the decomposition rate, the carbon material tends to grow into fibers, whereas when the thermal decomposition rate is faster than the growing rate, the carbon material tends to grow in circumferential directions of the catalyst particle. Accordingly, by changing the balance between the thermal decomposition rate and the growing rate intentionally, it is possible to control the growth of carbon material to occur in multi-direction rather than in single direction, and to produce three dimensional structures according to the present invention.

In order to form the above mentioned three-dimensional configuration, where the fibers are bound together by granular part(s), with ease, it is desirable to optimize the compositions such as the catalyst used, the residence time in the reaction furnace, the reaction temperature and the gas temperature.

As a raw material organic compound, hydrocarbons such as benzene, toluene, xylene; carbon monoxide (CO); and alcohols such as ethanol may be used. It is preferable, but not limited, to use as carbon sources at least two carbon compounds which have different decomposition temperatures. Here, the words "at least two carbon compounds" used herein not only include two or more kinds of raw materials, but also include one kind of raw material that can undergo a reaction, such as hydrodealkylation of toluene or xylene, during the course of synthesis of the fibrous structure such that in the subsequent thermal decomposition procedure it can function as at least two kinds of carbon compounds having different decomposition temperatures.

When as the carbon sources at least two kinds of carbon compounds are provided in the thermal decomposition reaction system, the decomposition temperatures of individual carbon compounds may be varied not only by the kinds of the carbon compounds, but also by the gas partial pressures of individual carbon compounds, or molar ratio between the compounds. Therefore, as the carbon compounds, a relatively large number of combinations can be used by adjusting the composition ratio of two or more carbon compounds in the raw gas.

For example, the carbon fibrous aggregator (intermediate) according to the present invention can be prepared by using two or more carbon compounds in combination, while adjusting the gas partial pressures of the carbon compounds so that each compound performs mutually different decomposition temperature within a selected thermal decomposition reaction temperature range, and/or adjusting the residence time for the carbon compounds in the selected temperature region, wherein the carbon compounds to be selected are selected from the group consisting of alkanes or cycloalkanes such as methane, ethane, propanes, butanes, pentanes, hexanes, heptanes, cyclopropane, cyclohexane, particularly, alkanes having 1-7 carbon atoms; alkenes or cycloolefin such as ethylene, propylene, butylenes, pentenes, heptenes, cyclopentene, particularly, alkenes having 1-7 carbon atoms; alkynes such as acetylene, propyne, particularly, alkynes having 1-7 carbon atoms; aromatic or heteroaromatic hydrocarbons such as benzene, toluene, styrene, xylene, naphthalene, methyl naphthalene, indene, phenanthrene, particularly, aromatic or heteroaromatic hydrocarbons having 6-18 carbon atoms; alcohols such as methanol, ethanol, particularly, alcohols having 1-7 carbon atoms; and other carbon compounds involving such as carbon monoxide, ketones, ethers. Further, optimizing the mixing ratio can contribute to the efficiency of the preparation.

When a combination of methane and benzene is utilized among such combinations of two or more carbon compounds, it is desirable that the molar ratio of methane/benzene is 1-600, preferably, 1.1-200, and more preferably 3-100. The ratio is for the gas composition ratio at the inlet of the reaction furnace. For instance, when as one of carbon sources toluene is used, in consideration of the matter that 100% of the toluene decomposes into methane and benzene in proportions of 1:1 in the reaction furnace, only a deficiency of methane may be supplied separately. For example, in the case of adjusting the methane/benzene molar ratio to 3, 2 mol methane may be added to 1 mol toluene. As the methane to be added to the toluene, it is possible to use the methane which is contained as an unreacted form in the effluent gas discharged from the reaction furnace, as well as a fresh methane specially supplied.

The carbon fibrous aggregators synthesized according to the present invention falls freely by their own weight in the reaction furnace. As described above, the turbulent flow is generated at the catalyst producing region by the raw material inlet nozzle as shown in FIG. 5. Concerning the mechanism for generation of the turbulent flow, because the raw material gas is pressurized by the inlet nozzle 9 when it is introduced into the reaction furnace, the vaporized raw material itself gains momentum when it enters the reaction furnace. Further, because the distributing and buffering board 10 exists near the inlet nozzle, the turbulent flow is generated. The catalyst metal particles are forced to rotate at high speed in the turbulent flow, and thus units which each comprise the continuance of three dimensionally extended structures are apt to be formed. When the carbon fibers taken the structure laterally extended in the three dimensional dimensions, the carbon fibers are apt to contact with each other when they are kneaded into a resin, and it becomes possible to obtain an advantage that the electrically conductive passes are easy to be formed.

It is preferable that the reaction progresses under the conditions that the catalyst amount per a reaction area is in the range of 0.01-0.50 mol/m$^2$/min and the raw material hydrocarbon amount per a reaction area is in the range of 1.0-15 mol/m$^2$/min. Concretely, when the reaction progresses in the ratio of raw materials as shown in Examples described below, it becomes possible to obtain the fibrous aggregators (intermediates) which each have a structure in which plural granular parts exists, and the granular parts and the carbon fiber parts extended from the each individual granular part are well developed in the three dimensional directions.

After making a series of contrivances on these system constructions and preparation of the raw materials, the present invention has been attained and this invention is able to synthesize the carbon fibrous aggregators which each have the three dimensionally extended structure and which have a sharp distribution in large quantity (several hundreds kg/day) by one reaction.

Further, the present invention can control the outer diameter of the carbon fiber.

Although some important aspects for manufacturing the carbon fibrous aggregators in which the outer diameter of the carbon fibers is controlled are enumerated below, the present invention is not limited thereto:

1) Concentration of the hydrocarbon compound in the raw material
2) Concentration ratio of hydrocarbon compound and catalyst metal in the raw material
3) Residence time in the reaction furnace It is preferable to increase the concentration of the hydrocarbon compound in the raw material in order to thicken the outer diameter of the carbon fibers. With respect to the concentration ratio of hydrocarbon compound and catalyst metal in the raw material, in the molar ratio between hydrocarbon compound and catalyst metal, the catalyst metal moiety may be slightly increased in proportion to the increment of the outer diameter. In the chemical vapor phase growing method, it is preferable to increase the amount of the metal catalyst which is used for growing the carbon fibers wherein the catalyst metal functions as nuclei.

As far as using the controlling method for the outer diameter according to the present invention, it is possible to control the outer diameter with ease, without making some modifications in the mechanical constitution of the interior of the reaction furnace. Therefore, it is possible to vary the outer diameter of the carbon fiber on a reaction basis, and thus, it is possible to provide various outer diameters' grades of products by using the same reaction furnace.

Incidentally, each intermediate obtained by heating the mixture gas of the catalyst and hydrocarbon at a constant temperature in the range of 800° C.-1300° C. has a structure that resembles sheets of carbon atoms laminated together, (and being still in half-raw, or incomplete condition). When analyzed with Raman spectroscopy, the D band of the intermediate is very large and many defects are observed. Further, each obtained intermediate is associated with unreacted raw materials, nonfibrous carbon, tar moiety, and catalyst metal.

Therefore, the intermediate is subjected to a high temperature heat treatment of 2400-3000° C. using a proper method in order to remove such residues from the intermediate and to produce the intended carbon fibrous aggregators which each have few defects.

For instance, the intermediates may be heated at 800-1200° C. to remove the unreacted raw material and volatile flux such as the tar moiety, and thereafter annealed at a high temperature of 2400-3000° C. to produce the intended aggregators and, concurrently, to vaporize the catalyst metal, which is included in the fibers, to remove it from the fibers. In this process, it is possible to add a small amount of a reducing gas or carbon monoxide into the inert gas atmosphere to protect the material structure.

By annealing the intermediates at a temperature of 2400-3000° C., the patch-like sheets of carbon atoms are rearranged to associate mutually and then form multiple graphene sheet-like layers.

with respect to the intermediate which is prepared by annealing as above, although it is preferable that the number of the defects in the graphene sheets which constitute the fine carbon fibers at the stage of this intermediate is low from the viewpoint of giving a high strength and a high electrical conductivity to the carbon fibrous aggregator of the present invention as the final product, but the defects should exist to a certain proper extent in order to cut the fibers. Concretely, for instance, it is preferable that the $I_D/I_G$ ratio of the intermediate determined by Raman spectroscopy is not more than 0.2, and the $I_{G'}/I_G$ ratio determined by the same is in the range of 0.6-1.2. Further, it is preferable that the G' band of the precursor shows an almost bilateral symmetry shape. Although the derivation of the G' band is not clear, it is considered that the G' band will take a bilateral symmetry shape when the graphene sheet becomes a cylindrical shape. Further, when the intensity of the D band is weak and the intensity of the G' band is strong, it is considered that the graphene sheet has a small amount of defects. Therefore, when both the intensity ratio ($R = I_{1360}/I_{1580} = I_D/I_G$) of the D band and the G band and the intensity ratio ($R=I_{2700}/I_{1580}=I_{G'}/I_G$) of the G' band and the G band are laid within the individual ranges as mentioned above, it is possible to say that the number of defects in graphene sheets is low, but the defects exist to a certain extent suitable for performing the selective cutting the carbon fiber parts at the defect portions.

Incidentally, the "defect" described herein denotes the incomplete portion of atomic arrangement of the graphene sheet (lattice defect) which is caused by the entry of unnecessary atom as an impurity, the lack of necessary carbon atom, or the misalignment of the carbon atom, etc., into the atomic arrangement of the graphene sheet which constitutes the intermediate or the like.

After or before such a high temperature heat treatment, the carbon fibrous aggregators may be subjected to crushing in order to obtain carbon fibrous aggregators, each having an area-based circle-equivalent mean diameter of several centimeters. Then, the obtained carbon fibrous aggregators may be subjected to pulverization in order to obtain the carbon fibrous aggregators each having a desired area-based circle-equivalent mean diameter of 20-100 µm. It is also possible to perform the pulverization directly without crushing. On the other hand, the aggregates involving plural carbon fibrous aggregators according to the present invention may also be granulated for adjusting shape, size, or bulk density to one's suitable for using a particular application. More preferably, in order to utilize effectively the above structure formed from the reaction, the annealing would be performed in a state such that the bulk density is low (the state that the fibers are extended as much as they can and the voidage is sufficiently large). Such a state may contribute to improved electric conductivity of a resin matrix.

The carbon fibrous aggregators according to the present invention may have the following properties:
A) a low bulk density;
B) a good dispersibility in a matrix such as resin;
C) a high electrical conductivity;
D) a high heat conductivity;
E) a good slidability;
F) a good chemical stability;
G) a high thermal stability;
H) easy to form uniform dispersion on the addition to a resin, etc.;
I) a narrow dispersion in the data of physical property such as electrical conductivity on the addition to a resin, etc.;
J) easy to control the formation of the skin layer on the addition to a resin, etc.

Thus, the carbon fibrous aggregators of the invention can be used in a wide range of applications, for example, as a filler for composite material to be added to a solid material such as resins, ceramics, metals, etc., or as an additive to a liquid material such as, fuel, lubricating oil, etc.

The following are examples of various applications according to functionalities. The present invention, however, is not limited to these examples.

1) One which Utilizes Electric Conductivity

For example, by combining carbon fibrous aggregators of the invention with a resin, the resultant conductive resin and conductive resin molded body may be suitably used as wrapping material, gasket, container, resistance body, conductive fiber, electric wire, adhesive, ink, paint, and etc. Similar effects can be expected from composite materials in which the carbon fibrous aggregators are added to an inorganic material, particularly, ceramic, metal, etc., in addition to the above mentioned composite with a resin.

2) One which Utilizes Heat Conductivity

It is possible to add the carbon fibrous aggregators to fuels to improve heat conduction, in addition to similar applications as above wherein electric conductivity is utilized.

3) One which Utilizes Electromagnetic Wave Shielding ability

By combining carbon fibrous aggregators with a resin, the resulting resin can be suitably used as electromagnetic wave shielding paint as well as electromagnetic wave shielding material for molding.

4) One which Utilizes Physical Characteristics

By combining them into a matrix such as a resin or a metal to improve the sliding ability of the matrix, which can then be used for rollers, brake parts, tires, bearings, lubricating oils, cogwheels, pantographs, etc.

Also, by taking advantage of their light-weight and toughness, they can be used in wires, bodies of consumer electronics, cars or airplanes, housing of machines, etc.

Additionally, it is possible to use them as a substitute for conventional carbon fibers or beads, as well as use in polar materials of batteries, switches, vibration dampers and etc.

5) One which Utilizes Thermal Stability

In order to improve the safety of flammable liquids such as fuels, lubricating oils, etc., during storage or transportation, the carbon fibrous aggregators may be added to the flammable liquids.

EXAMPLES

Hereinafter, this invention will be illustrated in detail by practical examples. However, the invention is not limited to the following examples.

The respective physical properties illustrated later are measured by the following protocols.

<Mean Outer Diameter of Fibers, Median Diameter, and Standard Deviation and Coefficient of Variation of the Outer Diameters of Fibers>

First, a photograph of carbon fibrous aggregators was taken with SEM (×35,000-×50,000 magnifications). On the basis of the taken SEM photo, with respect to one fiber in each individual carbon fibrous aggregator, the thickness of the fiber was determined using the image analysis software, Win-Roof™ (trade name, marketed by Mitani Corp.) from the direction perpendicular to the fiber extending direction, and then, the determined visual was converted into number to define the outer diameter of the carbon fiber. Using all carbon fibrous aggregators that can be taken as objects in one single field of view (approximately, 60-80 pieces), about 200 pieces in total of carbon fibers were measured with three fields of views. On the determinations, only carbon fibers with their clear contours in the aggregators were taken as objects to be measured. Incidentally, on the basis of the obtained these data, the mean outer diameter of the carbon fibers, median diameter, and the standard deviation and the coefficient of variation, CV, of the outer diameters of fibers were calculated.

<Mean Diameter of the Granular Parts, Ratio of the Mean Diameter of the granular parts to the mean outer diameter of the fibers, and Circle-Equivalent Mean Diameter of the Carbon Fibrous Aggregators>

A photograph of each carbon fibrous aggregator was taken with SEM. On the taken SEM photo (×5,000 magnifications), assuming each individual granular part which is the binding point of carbon fibers to be one particle, contours of the individual granular parts were traced using the image analysis software, WinRoof™ (trade name, marketed by Mitani Corp.), and area within each individual contour was measured, circle-equivalent mean diameter of each individual granular part was calculated, and then, the calculated data were averaged to determine the mean diameter of the granular parts of the carbon fibrous aggregators.

Roundness (R) is determined by inputting value of the area (A) within each individual contour computed by the above and a measured value of each individual contour's length (L) to the following equation to calculate the roundness of each individual granular part, and then, averaging the calculated data.

$$R = A * 4\pi / L^2$$

Further, the outer diameter of the fine carbon fibers in the individual carbon fibrous structures to be measured are determined, and then, from the outer diameter determined and the circle-equivalent mean diameter of the granular part calculated as above, the ratio of circle-equivalent mean diameter to the mean outer diameter of the carbon fibers is calculated for each individual carbon fibrous aggregator, and then the data obtained are averaged.

On the other hand, the circle-equivalent diameters of the carbon fibrous aggregators were quantified using SEM photos of a low magnification (×50-×300 magnifications). Incidentally, on the taken SEM photo, only carbon fibrous aggregators with a clear contour were taken as objects to be measured, and broken ones with unclear contours were omitted. Using all carbon fibrous aggregators that can be taken as objects in one single field of view (approximately, 60-80 pieces), about 200 pieces in total were measured with three fields of views.

<Measurement of Bulk Density>

1.00 g of powder sample of carbon fibrous aggregators was placed into a 70 mm caliber transparent cylinder equipped with a distribution plate, then air supply at 0.1 Mpa of pressure, and 1.30 liter in capacity was applied from the lower side of the distribution plate in order to blow off the powder and thereafter allowed the powder to settle naturally. After the fifth air blowing, the height of the settled powder layer was measured. Any 6 points were adopted as the measuring points, and the average of the 6 points was calculated in order to determine the bulk density.

<Raman Spectroscopic Analysis>

The Raman spectroscopic analysis was performed with LabRam 800 manufactured by HORIBA JOBIN YVON, S.A.S., using 514 nm argon laser.

<X Ray Diffraction>

Using the powder X ray diffraction equipment (JDX3532, manufactured by JEOL Ltd.), the intermediate after annealing processing and the carbon fibrous aggregator were determined. Kα ray which was generated with Cu tube at 40 kV, 30 mA was used, and the measurement of the spacing was performed in accordance with the method defined by The Japan Society for the Promotion of Science (JSPS), described in "Latest Experimental Technique For Carbon Materials (Analysis Part)", Edited by Carbon Society of Japan), and as the internal standard silicon powder was used.

<TG Oxidation Temperature>

Combustion behavior was determined using TG-DTA manufactured by MAC SCIENCE CO. LTD., at air flow rate of 0.1 liter/minute and heating rate of 10° C./minute with respect to a sample of the carbon fibrous aggregators which was weighed to be 10 mg and placed in an alumina crucible. When burning, TG indicates a quantity reduction and DTA indicates an exothermic peak. Thus, the top position of the exothermic peak was defined as the TG oxidation temperature.

<BET Specific Surface Area>

BET specific surface area was determined by using a continuous flowing type specific surface area analyzer (SA-9603, manufactured by HORIBA, Ltd.) which is based on the measurement principle of the continuous flowing type gas absorption method (BET single point method), weighing 50 mg of the powder of the carbon fibrous aggregators, loading the weighed powder into a measuring cell, and then measuring under liquid nitrogen.

<Particle's Resistance and Decompressibility>

1.00 g of powder sample of the carbon fibrous aggregators was scaled, and then press-loaded into a resinous die (inner dimensions: L 40 mm, W 10 mm, H 80 mm), and the displacement and load were read out. A constant current was applied to the powder by the four-terminal method, and in this condition the voltage was measured. After measuring the voltage until the density came to 0.9 g/cm$^3$, the applied pressure was released and the density after decompression was measured. Measurements taken when the powder was compressed to 0.8 or 0.9 g/cm$^3$ were adopted as the particle's resistance.

<Surface Resistivity>

Referring to JIS K 7194 (Resistivity testing method of electrically conductive plastic according to 4-pin probe method), according to the measurement position and the measurement method therein, and using LORESTA-GP (MCP-T600 type, manufactured by Mitsubishi Chemical), and HIR-ESTA-UP (MCP-HT450 type, manufactured by Mitsubishi Chemical), surface resistivity for the test pieces of the injection molding was measured.

First intermediate of the carbon fibrous aggregators was synthesized by using the system shown in FIG. 2 and using toluene as the raw material. The synthesis was carried out in accordance with the prescribed raw material blending ratio, temperature setting, and gas flow rates as shown in Table 7, and in the presence of a mixture of ferrocene and thiophene as the catalyst, and under the reducing atmosphere of hydrogen gas. Toluene and the catalyst were heated to 400° C. along with the hydrogen gas, and then they were supplied to the reaction furnace. In the temperature zone of about 400° C.-900° C., ferric catalyst was generated from ferrocene, and thereafter carbon fibers are grown from the ferric catalyst. Further the raw material underwent thermal decomposition at 1300° C. in order to obtain the first intermediate of the carbon fibrous aggregators.

The reaction furnace used for the first intermediate of the carbon fibrous aggregators is illustrated schematically in FIG. 2. As shown in FIG. 2, the reaction furnace 8 was equipped at the upper part thereof with a inlet nozzle 9 for introducing the raw material mixture gas comprising toluene, catalyst and hydrogen gas as aforementioned into the reaction furnace 8. Further, at the outside of the inlet nozzle 9, a cylindrical-shaped distributing and buffering board 10 was provided. The distributing and buffering board 10 was set to be able to interfere in the raw material gas flow introduced from the raw material introducing port 14 located at the lower end of the inlet nozzle 9. In the reaction furnace 8 used in this Example, given that the inner diameter of the inlet nozzle 9, the inner diameter of the reaction furnace 8, the inner diameter of the cylindrical-shaped distributing and buffering board 10, the distance from the upper end of the reaction furnace 8 to the raw material mixture gas introducing port 14, the distance from the raw material mixture gas introducing port 14 to the lower end of the distributing and buffering board 10, and the distance from the raw material mixture gas introducing port 14 to the lower end of the reaction furnace 8 were "a", "b", "c", "d", "e", and "f", respectively, the ratio among the above dimensions was set as a:b:c:d:e:f=1.0:3.6:1.8:3.2:2.0:21.0.

Alternatively, since the controls of flow and temperature are important at the zone for generating ferric catalyst from ferrocene as mentioned above, the temperature of the outer wall of the raw material introducing nozzle (denoted by the numeral "9" in FIG. 2) was controlled by adjusting the flow rate of the nitrogen gas as shown in FIG. 5. Thereby, a temperature gradient among the temperature zones (A), (B), and (C) shown in FIG. 5 was contributed. As a result, the distribution of outer diameters of the carbon fibers in the thus obtained aggregators of the present invention became sharp. Further, the setting values and measured values for temperatures at the raw material introducing nozzle and other positions, which were used when various carbon fiber types having their respective varied mean outer diameter were manufactured, are described in detail in Table 7. Incidentally, the temperatures of the temperature zones (A), (B) and (C) were measured by using thermocouples. In the lateral direction, the thermocouples were placed at the center of the reaction furnace, and in the longitudinal direction, the thermocouples for the temperature zone (A), (B), and (C) were placed at the position of the half of "d", the position of the half of "e", and the position at 50 mm under from the gas introducing port 14 in FIG. 2, respectively.

The first intermediate for the carbon fibrous aggregators synthesized as above was baked at 900° C. in argon gas in order to remove hydrocarbons such as tar, which had been included as impurities, and thus to purify. The R value measured by the Raman spectroscopic analysis of the fibrous aggregators after receiving the removing and purification (second intermediate) was found to be 0.98. Further, the fibrous aggregators (second intermediate) underwent a high temperature heat treatment at 2600° C. in argon gas. The thus obtained carbon fibrous aggregators underwent pulverization using an air flow pulverizer in order to produce the fibrous aggregators which each had three dimensionally spreading elongation and which were substance in the previous stage of the carbon fibrous aggregators according to the present invention. FIGS. 12-18 show SEM photos of the obtained fibrous aggregators as mounted them as-is on a sample holder for electron microscope. The data for the distributions of fiber outer diameters of the obtained carbon fibrous aggregators are shown in Tables 1-5. The results for mean outer diameter of the fibers, median diameter, standard deviation and coefficient of variation of the outer diameters distribution, mean diameter of the granular parts, and mean distance of the fiber between granular parts are shown in Table 8.

TABLE 1

| Distribution of the fiber outer diameters | Example 1 (pieces) |
| --- | --- |
| <5 nm | 0 |
| 5 nm to <10 nm | 20 |
| 10 nm to <15 nm | 48 |
| 15 nm to <20 nm | 108 |
| 20 nm to <25 nm | 68 |
| 25 nm to <30 nm | 17 |
| 30 nm to <35 nm | 4 |
| 35 nm to <40 nm | 1 |
| 40 nm to <45 nm | 1 |
| 45 nm to <50 nm | 0 |
| ≧50 nm | 0 |
| Mean fiber diameter | 20.0 (nm) |

TABLE 2

| Distribution of the fiber outer diameters | Example 2 (pieces) |
| --- | --- |
| <5 nm | 0 |
| 5 nm to <10 nm | 0 |
| 10 nm to <15 nm | 2 |
| 15 nm to <20 nm | 8 |
| 20 nm to <25 nm | 22 |
| 25 nm to <30 nm | 27 |
| 30 nm to <35 nm | 73 |
| 35 nm to <40 nm | 114 |
| 40 nm to <45 nm | 135 |
| 45 nm to <50 nm | 113 |
| 50 nm to <55 nm | 71 |
| 55 nm to <60 nm | 30 |
| 60 nm to <65 nm | 9 |
| 65 nm to <70 nm | 6 |
| 70 nm to <75 nm | 2 |
| 75 nm to <80 nm | 3 |
| ≧80 nm | 0 |
| Mean fiber diameter | 37.8 (nm) |

TABLE 3

| Distribution of the fiber outer diameters | Example 3 (pieces) |
| --- | --- |
| <30 nm | 1 |
| 30 nm to <40 nm | 21 |
| 40 nm to <50 nm | 55 |
| 50 nm to <60 nm | 104 |
| 60 nm to <70 nm | 106 |
| 70 nm to <80 nm | 40 |
| 80 nm to <90 nm | 28 |
| 90 nm to <100 nm | 12 |
| ≧100 nm | 2 |
| Mean fiber diameter | 61.5 (nm) |

TABLE 4

| Distribution of the fiber outer diameters | Example 4 (pieces) |
| --- | --- |
| <50 nm | 6 |
| 50 nm to <60 nm | 5 |
| 60 nm to <70 nm | 25 |
| 70 nm to <80 nm | 44 |
| 80 nm to <90 nm | 100 |
| 90 nm to <100 nm | 132 |
| 100 nm to <110 nm | 144 |
| 110 nm to <120 nm | 172 |
| 120 nm to <130 nm | 145 |
| 130 nm to <140 nm | 111 |
| 140 nm to <150 nm | 32 |
| 150 nm to <160 nm | 24 |
| 160 nm to <170 nm | 8 |
| 170 nm to <180 nm | 3 |
| 180 nm to <190 nm | 1 |
| 190 nm to <200 nm | 6 |
| ≧200 nm | 7 |
| Mean fiber diameter | 117.3 (nm) |

TABLE 5

| Distribution of the fiber outer diameters | Example 5 (pieces) |
| --- | --- |
| 60 nm to <70 nm | 1 |
| 70 nm to <80 nm | 3 |

TABLE 5-continued

| Distribution of the fiber outer diameters | Example 5 (pieces) |
|---|---|
| 80 nm to <90 nm | 13 |
| 90 nm to <100 nm | 26 |
| 100 nm to <110 nm | 57 |
| 110 nm to <120 nm | 125 |
| 120 nm to <130 nm | 193 |
| 130 nm to <140 nm | 180 |
| 140 nm to <150 nm | 143 |
| 150 nm to <160 nm | 103 |
| 160 nm to <170 nm | 40 |
| 170 nm to <180 nm | 24 |
| 180 nm to <190 nm | 20 |

TABLE 5-continued

| Distribution of the fiber outer diameters | Example 5 (pieces) |
|---|---|
| 190 nm to <200 nm | 6 |
| 200 nm to <210 nm | 5 |
| 210 nm to <220 nm | 3 |
| 220 nm to <230 nm | 4 |
| 230 nm to <240 nm | 1 |
| 240 nm to <250 nm | 4 |
| 250 nm to <260 nm | 2 |
| 260 nm to <270 nm | 1 |
| 270 nm to <280 nm | 2 |
| 290 nm to <300 nm | 1 |
| ≧300 nm | 1 |
| Mean fiber diameter | 136.8 (nm) |

TABLE 6

| Distribution of the fiber outer diameters | Example 6 (pieces) |
|---|---|
| <30 nm | 1 |
| 30 nm to <40 nm | 21 |

TABLE 6-continued

| Distribution of the fiber outer diameters | Example 6 (pieces) |
|---|---|
| 40 nm to <50 nm | 71 |
| 50 nm to <60 nm | 91 |
| 60 nm to <70 nm | 94 |
| 70 nm to <80 nm | 40 |
| 80 nm to <90 nm | 28 |
| 90 nm to <100 nm | 12 |
| 100 nm to <110 nm | 4 |
| 110 nm to <120 nm | 7 |
| 120 nm to <130 nm | 2 |
| ≧130 nm | 5 |
| Mean fiber diameter | 63.8 (nm) |

TABLE 7

| Synthesis condition | Ex. 1 | Ex. 2 | Ex. 3 | Ex. 4 | Ex. 5 | Ctrl. 1 |
|---|---|---|---|---|---|---|
| Catalyst amount per unit of cross-sectional area of reaction furnace (mol/m²/min) | 0.07 | 0.13 | 0.38 | 0.14 | 0.23 | 0.19 |
| Hydrocarbon raw material amount per unit of cross-sectional area of reaction furnace (mol/m²/min) | 1.6 | 3.2 | 9.4 | 13.4 | 22.6 | 9.2 |
| Carrier gas flow rate (Nl/min) | 1850 | 1850 | 1850 | 1250 | 1450 | 1850 |
| Cooling nitrogen gas flow rate (Nl/min) | 8 | 6 | 4 | 2 | 3 | — |
| Temperature on introduction of raw material (° C.) | 400 | 400 | 400 | 400 | 400 | 400 |
| Temperature of temperature zone (A) (° C.) | 417 | 415 | 410 | 430 | 436 | 520 |
| Temperature of temperature zone (B) (° C.) | 680 | 681 | 685 | 705 | 726 | 750 |
| Temperature of temperature zone (C) (° C.) | 812 | 815 | 819 | 882 | 885 | 880 |
| Temperature of upper zone in reaction furnace (° C.) | 820 | 850 | 900 | 900 | 900 | 900 |
| Temperature of lower zone in reaction furnace (° C.) | 1300 | 1300 | 1300 | 1300 | 1300 | 1300 |
| Reaction yield (%) | 41.1 | 61.1 | 67.8 | 72.2 | 72.8 | 66.7 |

TABLE 8

| Quantity characteristic of carbon fibrous aggregators | Ex. 1 | Ex. 2 | Ex. 3 | Ex. 4 | Ex. 5 | Ctrl. 1 |
|---|---|---|---|---|---|---|
| Median diameter of fiber outer diameters (nm) | 20.0 | 38.0 | 61.0 | 115.0 | 133.0 | 61.0 |
| Mean outer diameter of fibers (nm) | 19.0 | 37.8 | 61.5 | 117.3 | 136.8 | 63.8 |
| Ratio of median diameter of fiber outer diameters to mean outer diameter of fibers (%) | 105 | 101 | 99 | 98 | 97 | 96 |
| Standard deviation of fiber outer diameters (nm) | 5.5 | 9.9 | 14.3 | 29.5 | 26.4 | 20.3 |
| Coefficient of variation of the fiber outer diameters (%) | 28.9 | 26.2 | 23.3 | 25.1 | 19.3 | 31.8 |
| Mean diameter of granular parts (nm) | 207 | 281 | 365 | 414 | 385 | 315 |
| Ratio of mean diameter of granular parts to mean fiber outer diameter (—) | 10.9 | 7.4 | 5.9 | 3.5 | 2.8 | 4.9 |

TABLE 8-continued

| Quantity characteristic of carbon fibrous aggregators | Ex. 1 | Ex. 2 | Ex. 3 | Ex. 4 | Ex. 5 | Ctrl. 1 |
|---|---|---|---|---|---|---|
| Mean distance of fiber between granular parts (μm) | 18.1 | 11.6 | 8.6 | 5.1 | 3.4 | 6.2 |

Further, various physical properties of the obtained carbon fibrous aggregators having their respective diameters were determined. The results are shown in Table 9. With respect to the mean outer diameter of fibers, fibers of Example 3 are similar to fibers of Control 1 (Example 3: 61.5 nm, Control 1: 63.8 nm), and with respect to the other physical properties, they are nearly equivalent to each other. Thus, precursors obtained in Synthetic Example 1 are shown in FIG. 5. Therefore, it is understood that only the CV value is decreased by the control of the outer diameter distribution according to the present invention.

TABLE 9

| Physical properties of carbon fibrous aggregator | Ex. 1 | Ex. 2 | Ex. 3 | Ex. 4 | Ex. 5 | Ctrl. 1 |
|---|---|---|---|---|---|---|
| Circle-equivalent mean diameter of carbon fibrous aggregators (μm) | 124.1 | 100.5 | 69.8 | 48.3 | 35.6 | 70.6 |
| Bulk density (g/cm$^3$) | 0.0029 | 0.0034 | 0.0048 | 0.0050 | 0.0090 | 0.0057 |
| $I_D/I_G$ ratio (—) | 0.092 | 0.089 | 0.083 | 0.071 | 0.116 | 0.076 |
| TG combustion temperature (° C.) | 756 | 779 | 790 | 832 | 816 | 768 |
| Spacing for (002) faces (nm) | 0.3962 | 0.3903 | 0.3832 | 0.3845 | 0.3386 | 0.3841 |
| BET specific surface area (m$^2$/g) | 52.0 | 34.5 | 24.2 | 17.2 | 13.0 | 25.0 |
| Particle's resistivity at 0.8 g/cm$^3$ (Ω·cm) | 0.0068 | 0.0079 | 0.0100 | 0.0125 | 0.0181 | 0.0096 |
| Particle's resistivity at 0.9 g/cm$^3$ (Ω·cm) | 0.0059 | 0.0067 | 0.0086 | 0.0109 | 0.0217 | 0.0085 |
| Density after decompression (g/cm$^3$) | 0.31 | 0.26 | 0.21 | 0.17 | 0.24 | 0.24 |

Example 1

In Example 1, using raw material blending ratio, temperature conditions, and gas flow rates as shown in Table 7, and setting the operation condition to 3 hours, the first intermediate of the carbon fibrous aggregators was synthesized.

Figure 6:
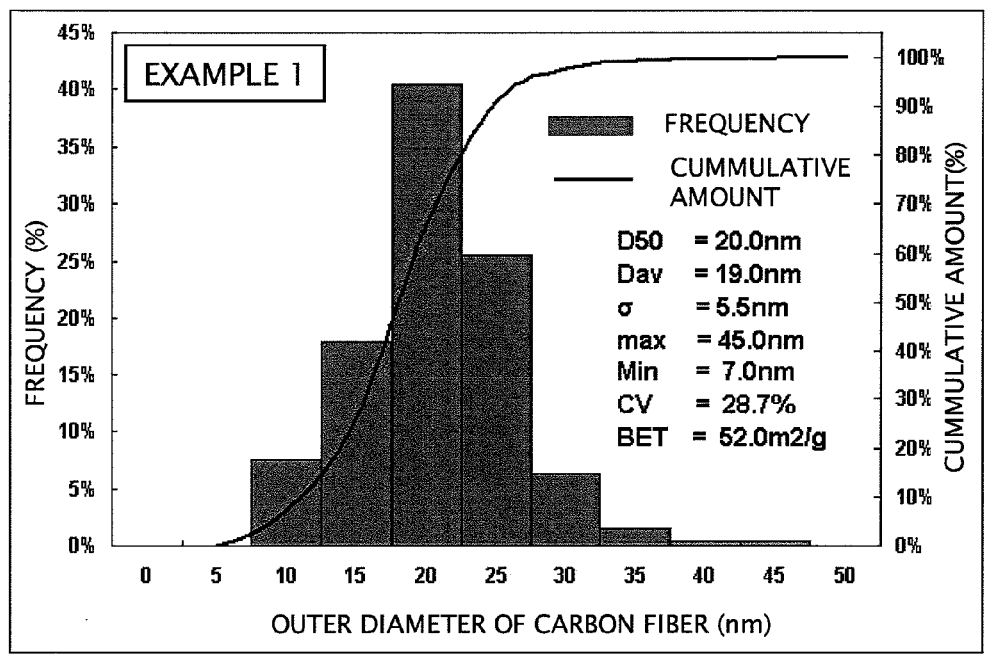
FIG. 6 is a histogram of outer diameters of carbon fibers which were produced in Example 1.

On the operation, the temperature control of the temperature zones (A), (B), and (C) shown in FIG. 5 was performed by setting the cooling gas flow rate to 8 NL/min. The reaction yield (=(weight of the obtained carbon fiber aggregators/weight of carbon in the raw material)×100) was found to be 41.1%. With respect to the carbon fibrous aggregators which were obtained from the first intermediate after undergoing the above mentioned steps such as the heat treatment, it was found that the mean outer diameter of fibers was 19.0 nm, the standard deviation of fiber outer diameters was 5.5 nm, the coefficient of variation of the fiber outer diameters was 28.9%. The distribution of the fiber diameters is shown in Table 1, and the distribution histogram thereof is shown in FIG. 6.

Example 2

In Example 2, using raw material blending ratio, temperature conditions, and gas flow rates as shown in Table 7, and setting the operation condition to 3 hours, the first intermediate of the carbon fibrous aggregators was synthesized.

Figure 7:
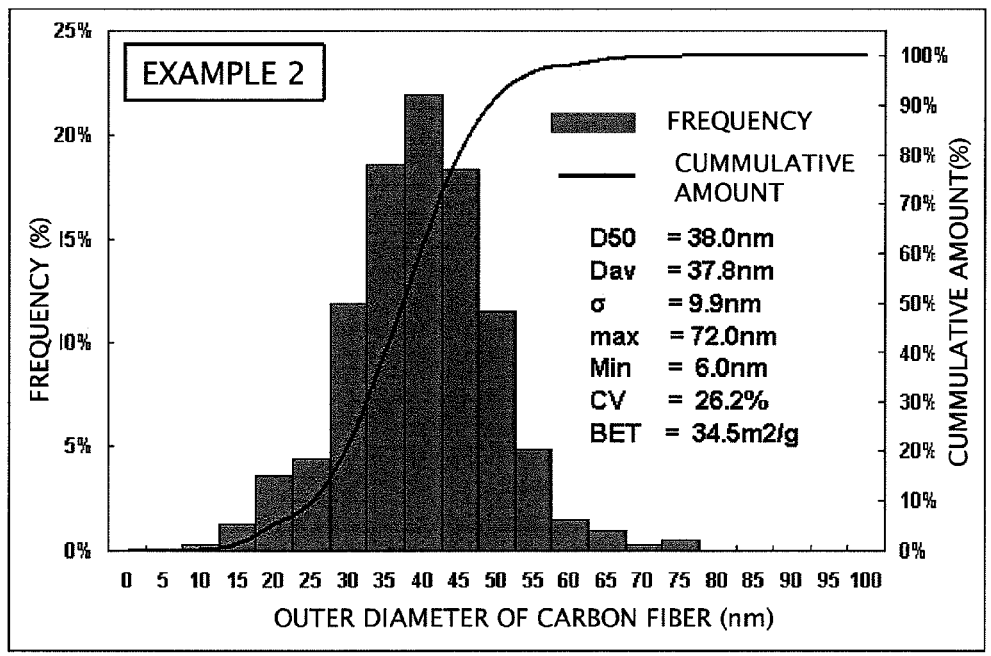
FIG. 7 is a histogram of outer diameters of carbon fibers which were produced in Example 2.

On the operation, the temperature control of the temperature zones (A), (B), and (C) shown in FIG. 5 was performed by setting the cooling gas flow rate to 6 NL/min. The reaction yield was found to be 61.1%. With respect to the carbon fibrous aggregators which were obtained from the first intermediate after undergoing the above mentioned steps such as the heat treatment, it was found that the mean outer diameter of fibers was 37.8 nm, the standard deviation of fiber outer diameters was 9.9 nm, the coefficient of variation of the fiber outer diameters was 26.2%. The distribution of the fiber diameters is shown in Table 2, and the distribution histogram thereof is shown in FIG. 7.

Example 3

In Example 3, using raw material blending ratio, temperature conditions, and gas flow rates as shown in Table 7, and setting the operation condition to 3 hours, the first intermediate of the carbon fibrous aggregators was synthesized.

Figure 8:
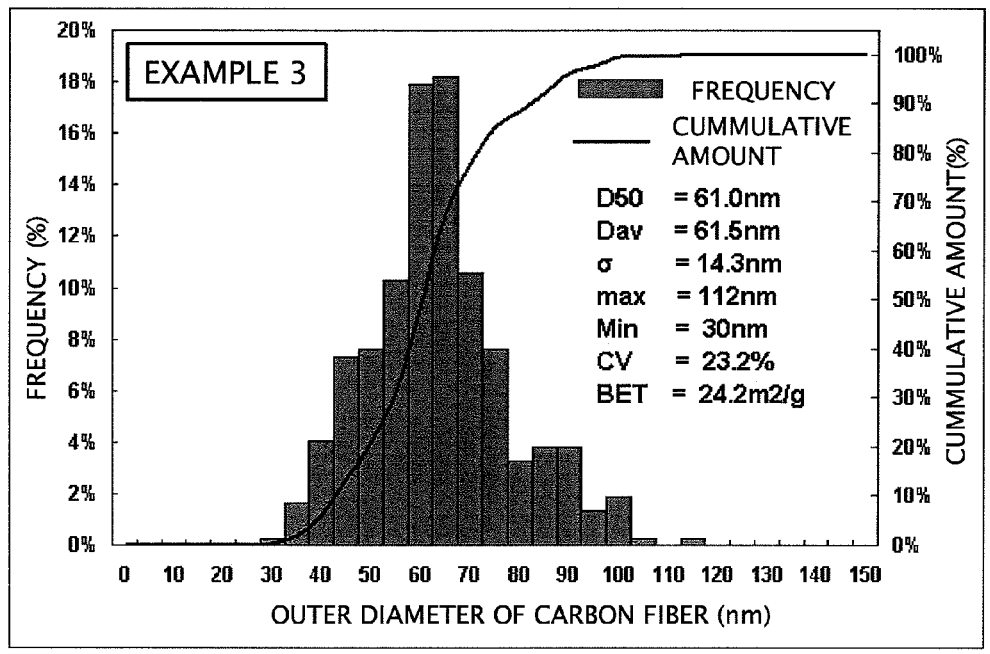
FIG. 8 is a histogram of outer diameters of carbon fibers which were produced in Example 3.

On the operation, the temperature control of the temperature zones (A), (B), and (C) shown in FIG. 5 was performed by setting the cooling gas flow rate to 4 NL/min. The reaction yield was found to be 67.8%. With respect to the carbon fibrous aggregators which were obtained from the first intermediate after undergoing the above mentioned steps such as the heat treatment, it was found that the mean outer diameter of fibers was 61.5 nm, the standard deviation of fiber outer diameters was 14.3 nm, the coefficient of variation of the fiber outer diameters was 23.3%. The distribution of the fiber diameters is shown in Table 3, and the distribution histogram thereof is shown in FIG. 8.

Example 4

In Example 4, using raw material blending ratio, temperature conditions, and gas flow rates as shown in Table 7, and setting the operation condition to 3 hours, the first intermediate of the carbon fibrous aggregators was synthesized.

Figure 9:
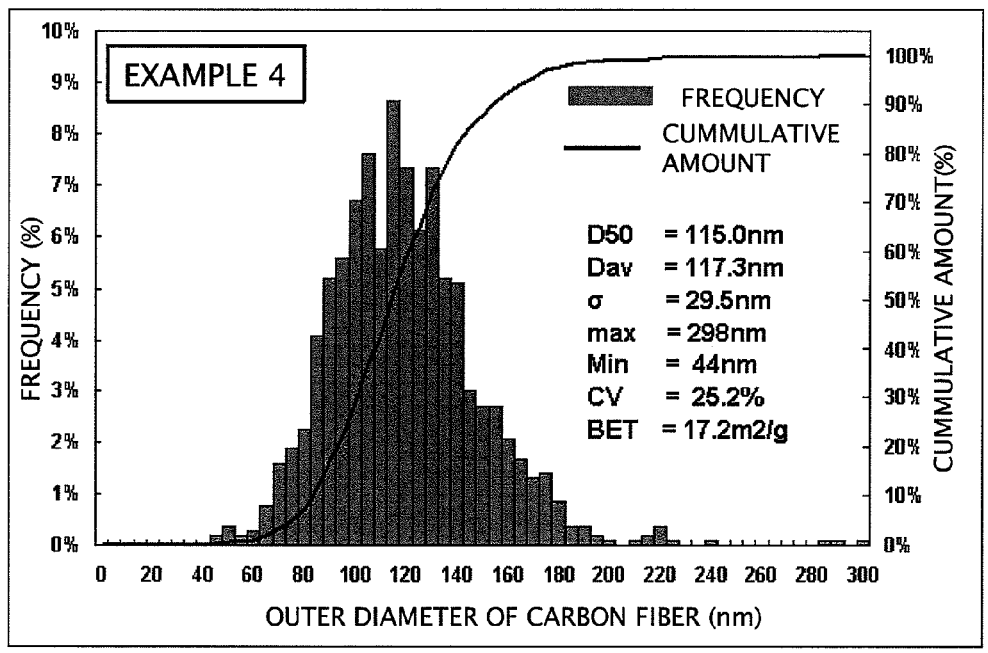
FIG. 9 is a histogram of outer diameters of carbon fibers which were produced in Example 4.

On the operation, the temperature control of the temperature zones (A), (B), and (C) shown in FIG. 5 was performed by setting the cooling gas flow rate to 2 NL/min. The reaction yield was found to be 72.2%. With respect to the carbon fibrous aggregators which were obtained from the first intermediate after undergoing the above mentioned steps such as the heat treatment, it was found that the mean outer diameter of fibers was 117.3 nm, the standard deviation of fiber outer diameters was 29.5 nm, the coefficient of variation of the fiber outer diameters was 25.1%. The distribution of the fiber diameters is shown in Table 4, and the distribution histogram thereof is shown in FIG. 9.

Example 5

In Example 5, using raw material blending ratio, temperature conditions, and gas flow rates as shown in Table 7, and setting the operation condition to 3 hours, the first intermediate of the carbon fibrous aggregators was synthesized.

Figure 10:
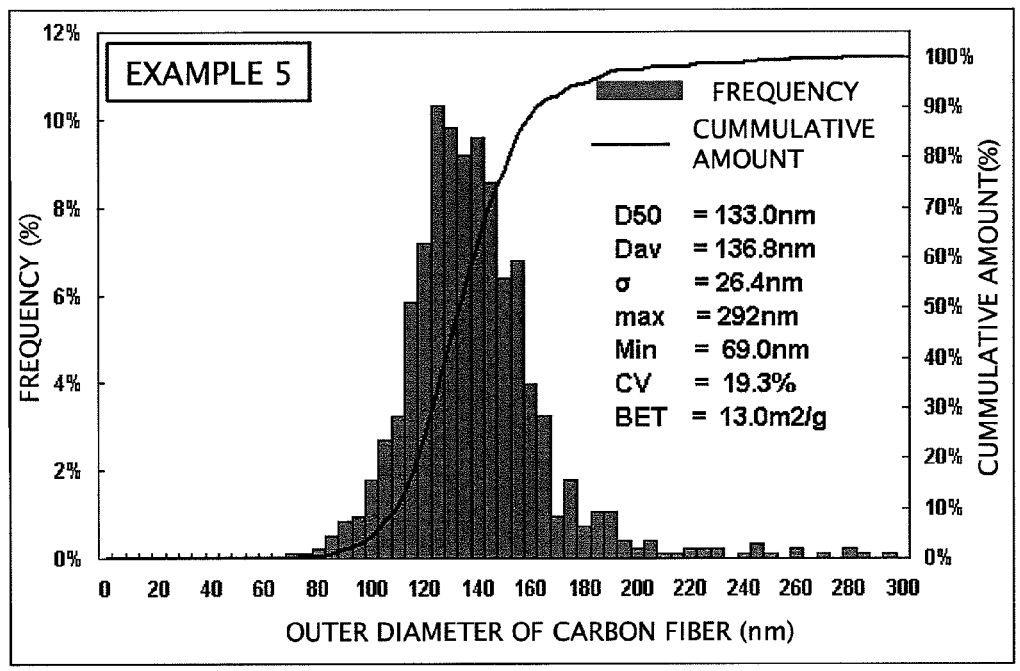
FIG. 10 is a histogram of outer diameters of carbon fibers which were produced in Example 5.

On the operation, the temperature control of the temperature zones (A), (B), and (C) shown in FIG. 5 was performed by setting the cooling gas flow rate to 3 NL/min. The reaction yield was found to be 72.8%. With respect to the carbon fibrous aggregators which were obtained from the first intermediate after undergoing the above mentioned steps such as the heat treatment, it was found that the mean outer diameter of fibers was 136.8 nm, the standard deviation of fiber outer diameters was 26.4 nm, the coefficient of variation of the fiber outer diameters was 19.3%. The distribution of the fiber diameters is shown in Table 5, and the distribution histogram thereof is shown in FIG. 10.

[Control 1]

In Control 1, using raw material blending ratio, temperature conditions, and gas flow rates as shown in Table 7, and setting the operation condition to 3 hours, the first intermediate of the carbon fibrous aggregators was synthesized.

Figure 11:
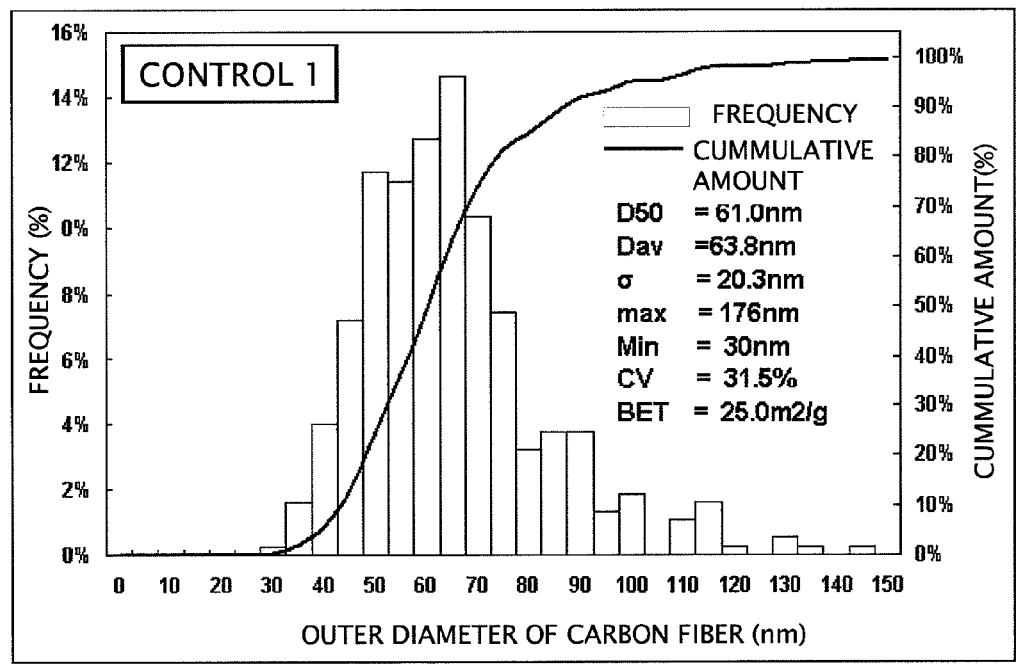
FIG. 11 is a histogram of outer diameters of carbon fibers which were produced in Control 1.
Figure 12:
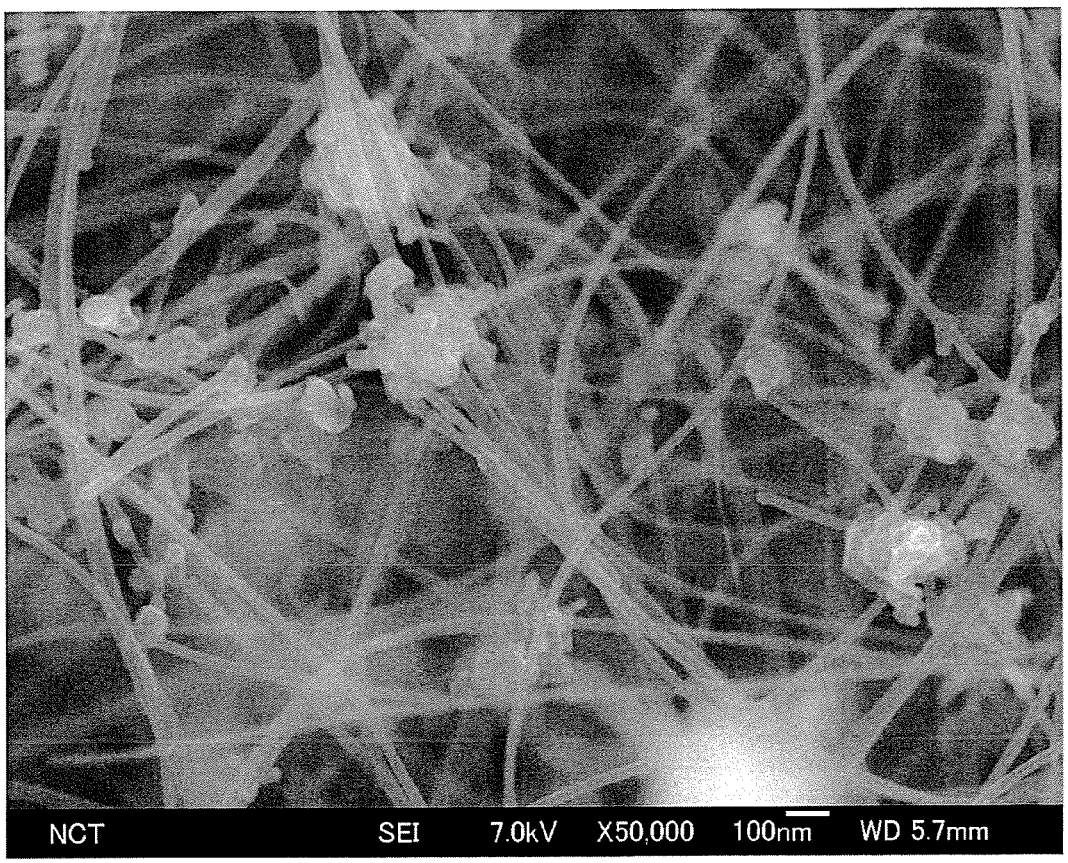
FIG. 12 is a SEM photo of carbon fibers which were produced in Example 1 (photo-magnification of ×50,000).
Figure 13:
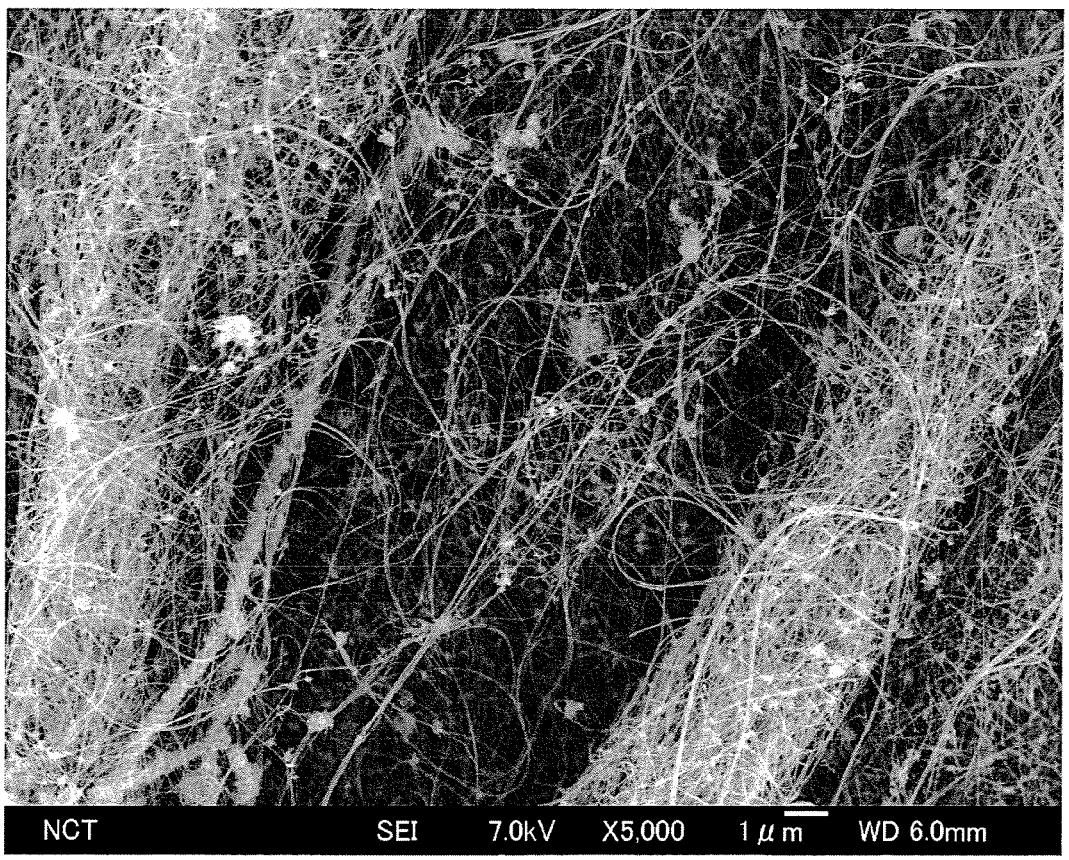
FIG. 13 is a SEM photo of carbon fibers which were produced in Example 1 (photo-magnification of ×5,000).
Figure 14:
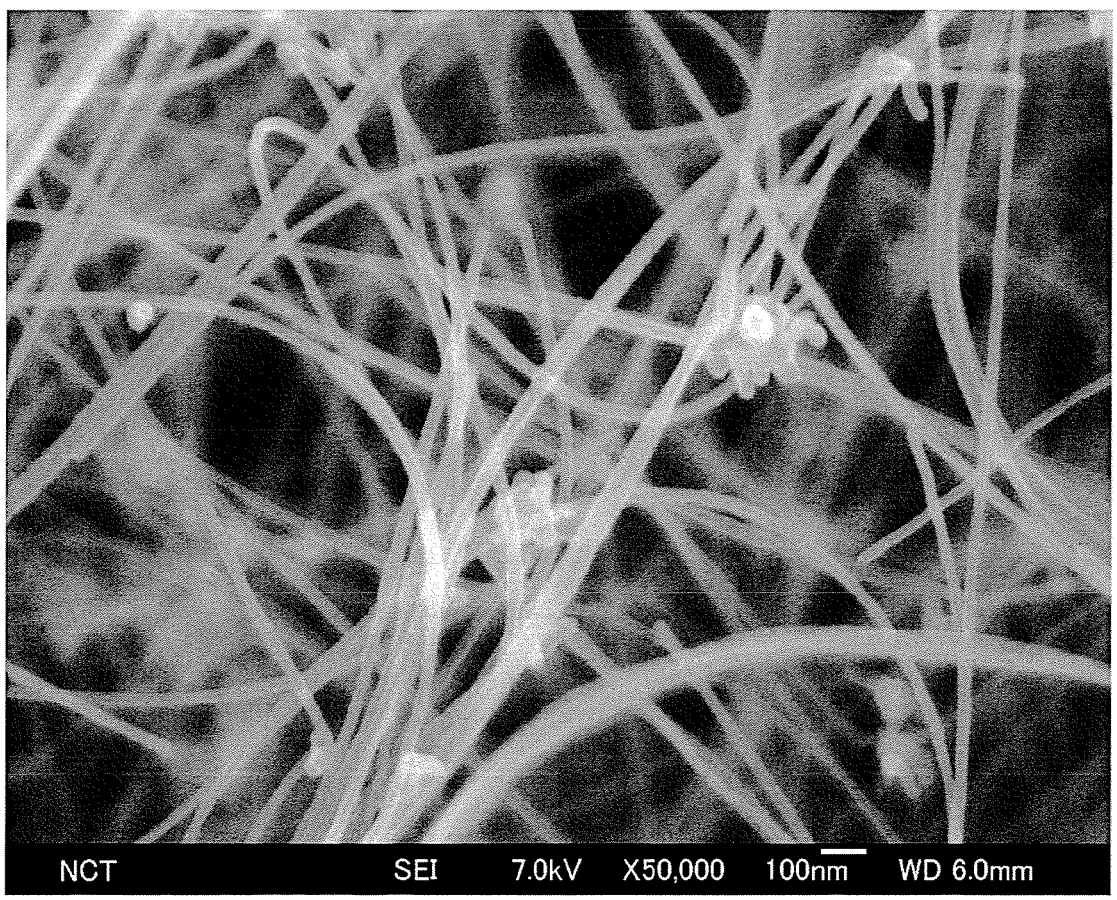
FIG. 14 is a SEM photo of carbon fibers which were produced in Example 2 (photo-magnification of ×50,000).
Figure 15:
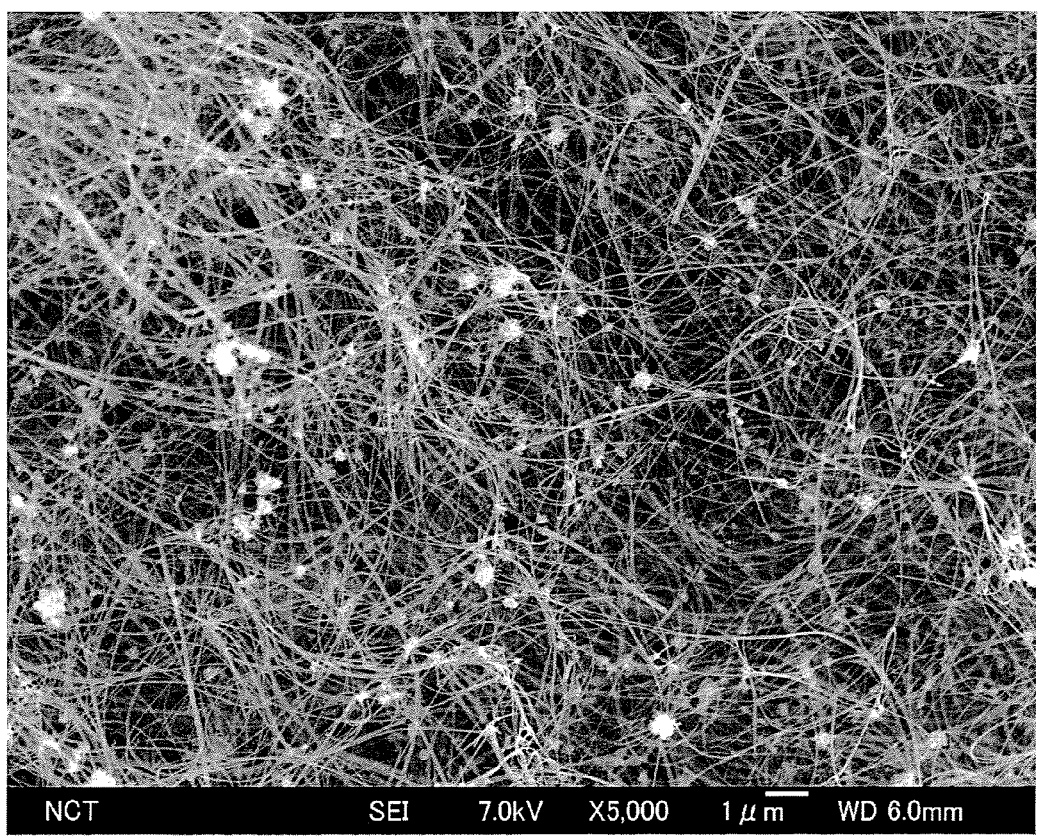
FIG. 15 is a SEM photo of carbon fibers which were produced in Example 2 (photo-magnification of ×5,000).
Figure 16:
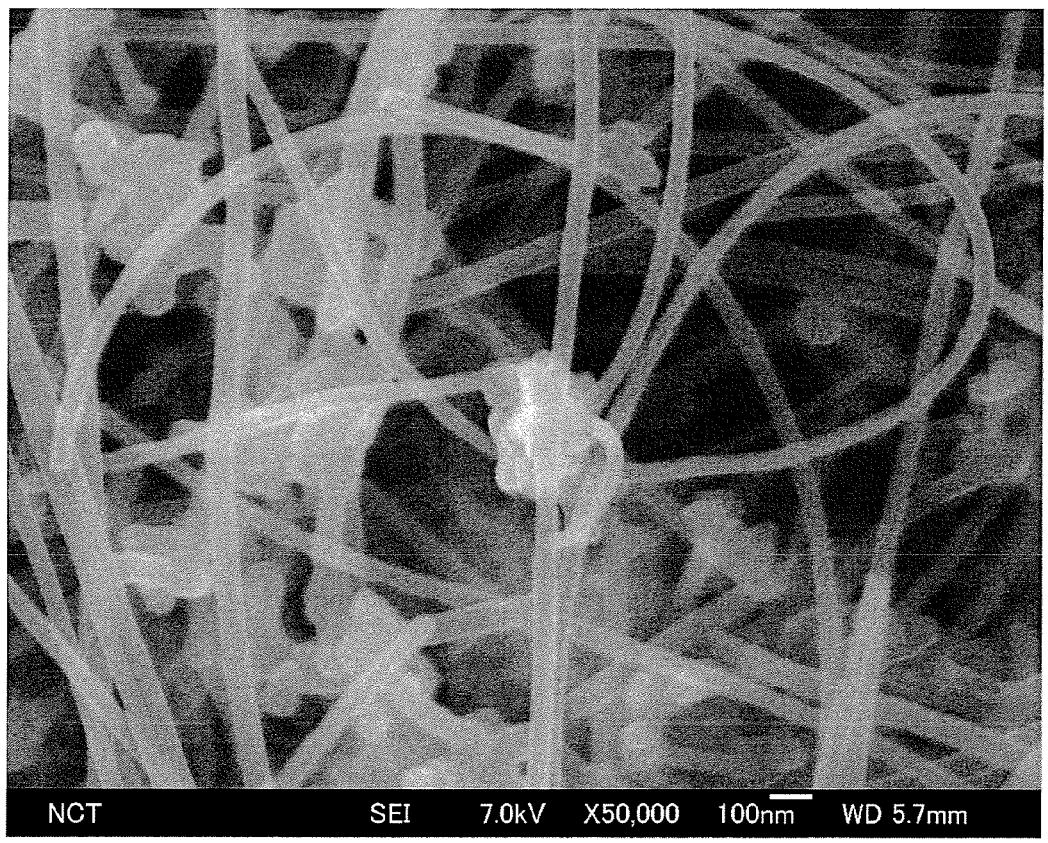
FIG. 16 is a SEM photo of carbon fibers which were produced in Example 3 (photo-magnification of ×50,000).
Figure 17:
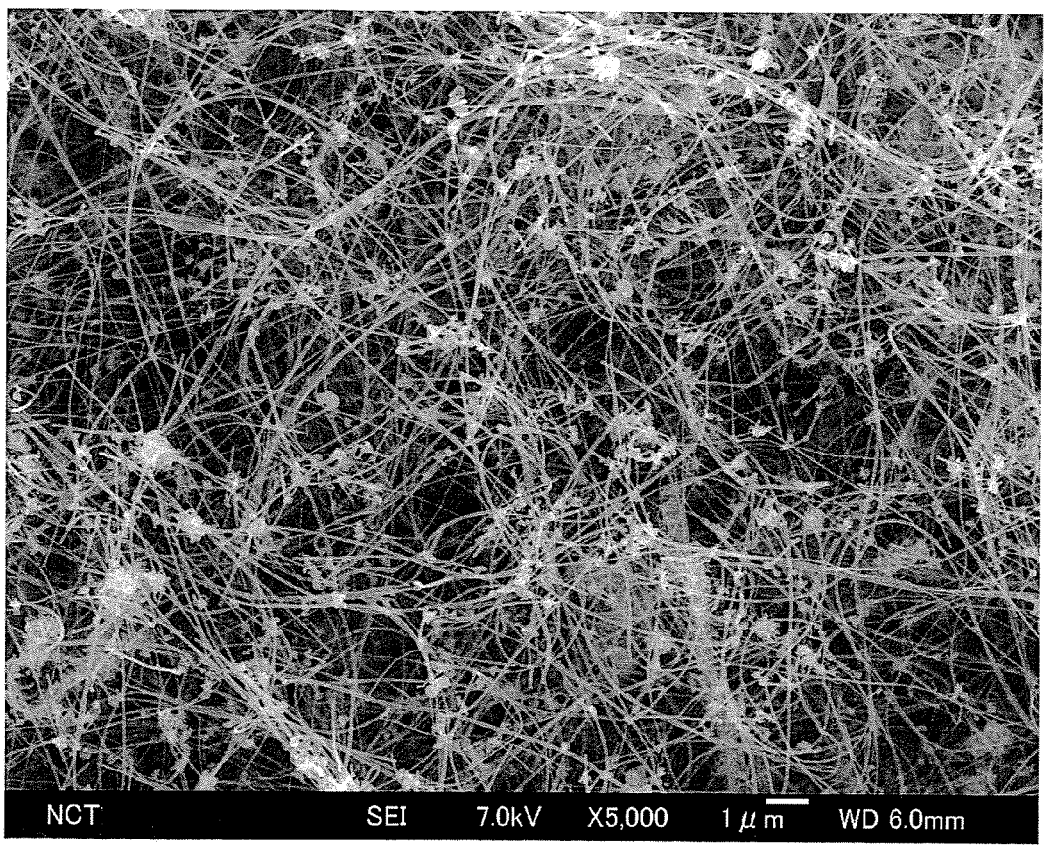
FIG. 17 is a SEM photo of carbon fibers which were produced in Example 3 (photo-magnification of ×5,000).
Figure 18:
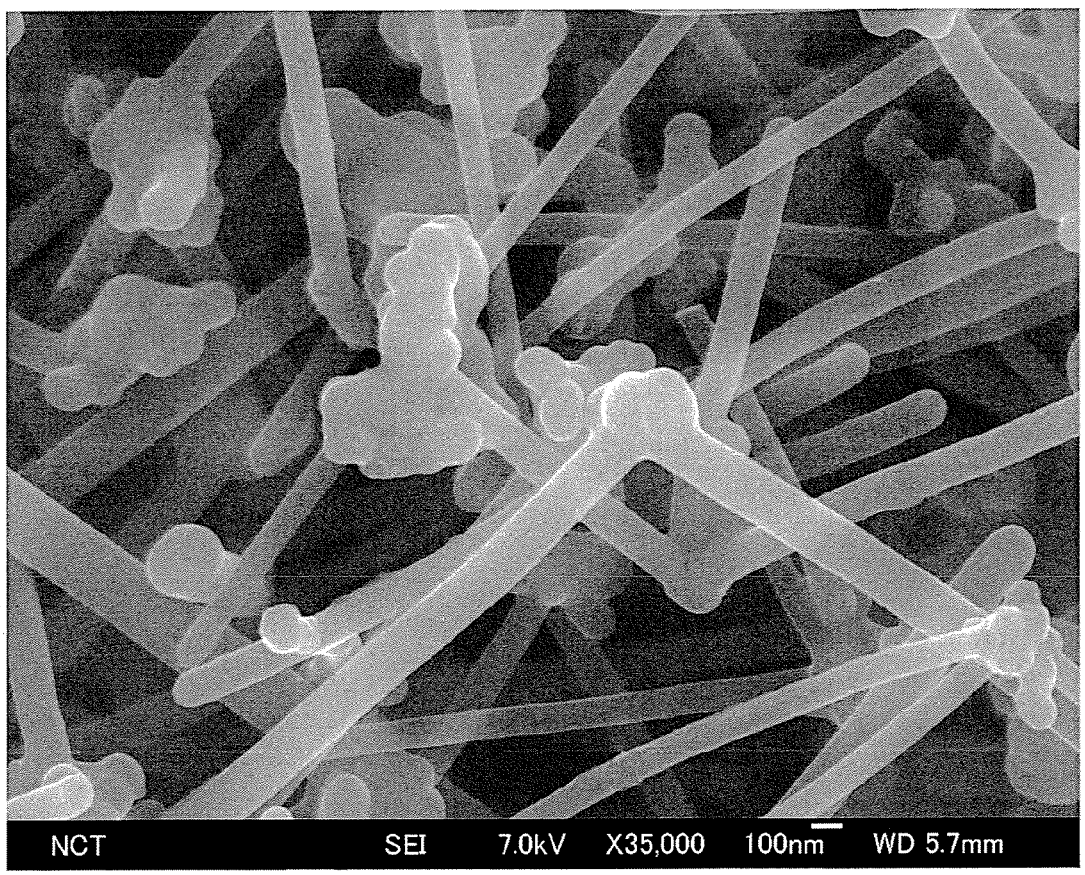
FIG. 18 is a SEM photo of carbon fibers which were produced in Example 4 (photo-magnification of ×35,000).
Figure 19:
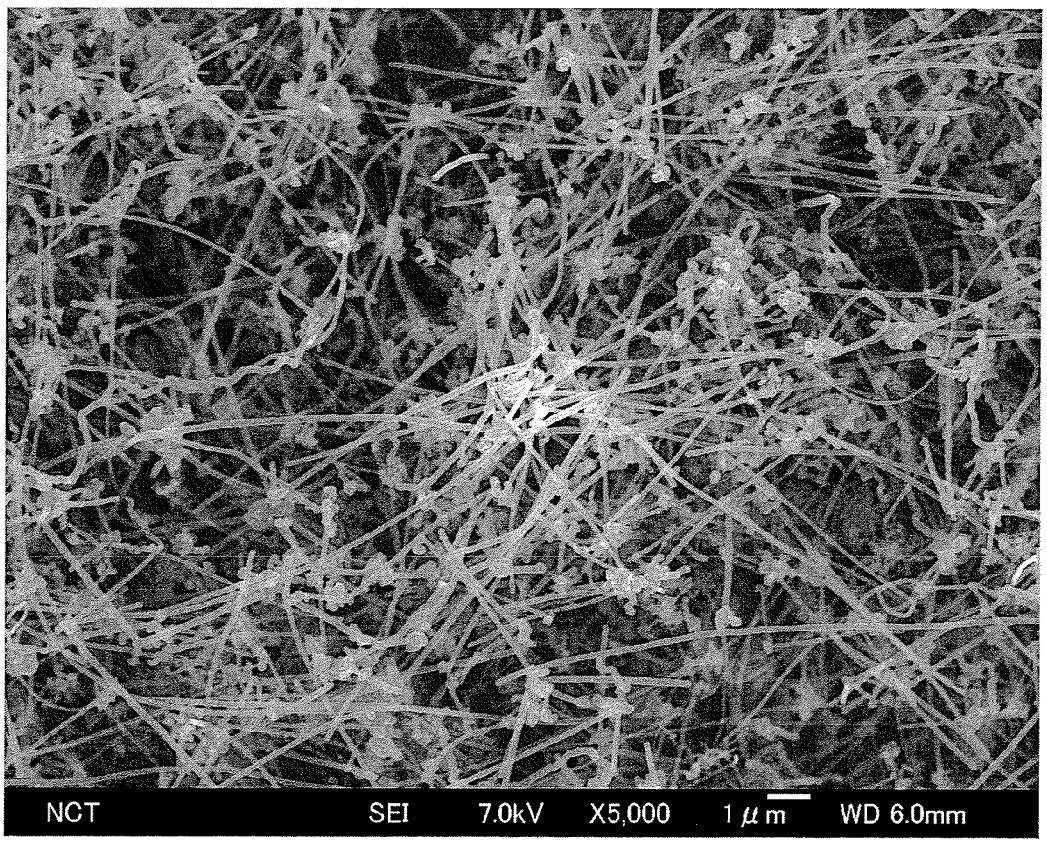
FIG. 19 is a SEM photo of carbon fibers which were produced in Example 4 (photo-magnification of ×5,000).
Figure 20:
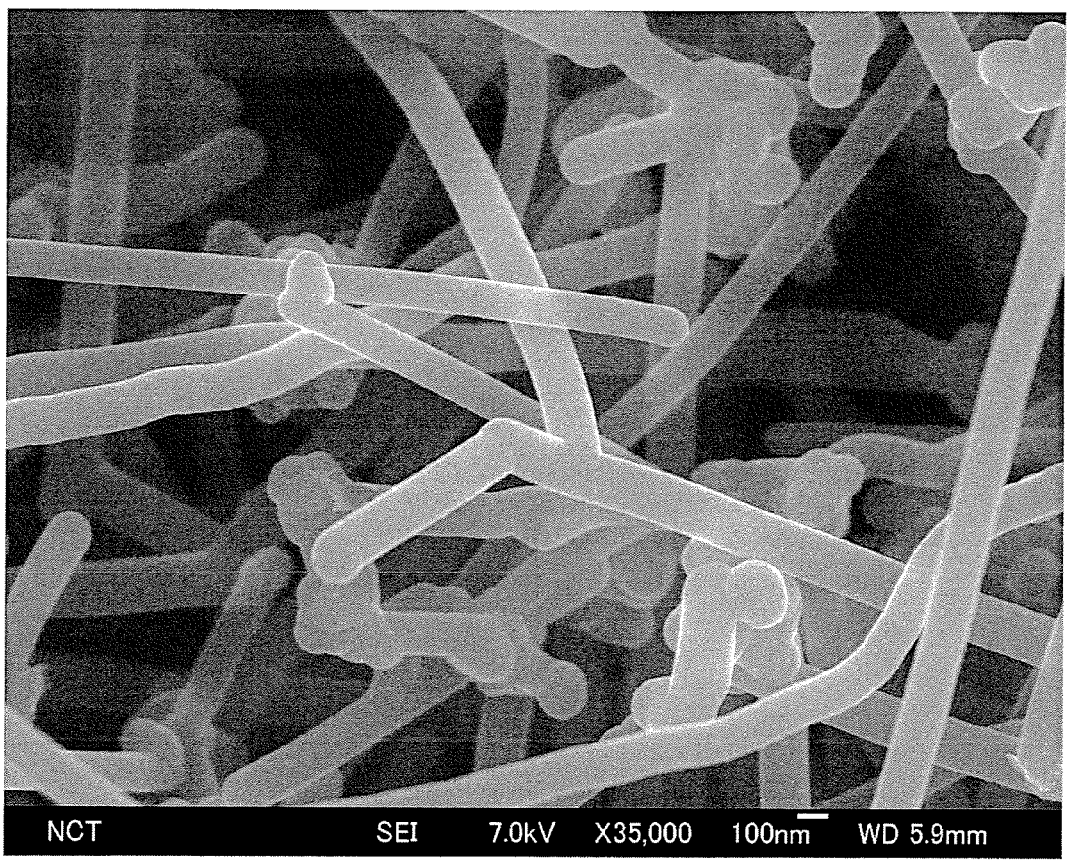
FIG. 20 is a SEM photo of carbon fibers which were produced in Example 5 (photo-magnification of ×35,000).
Figure 21:
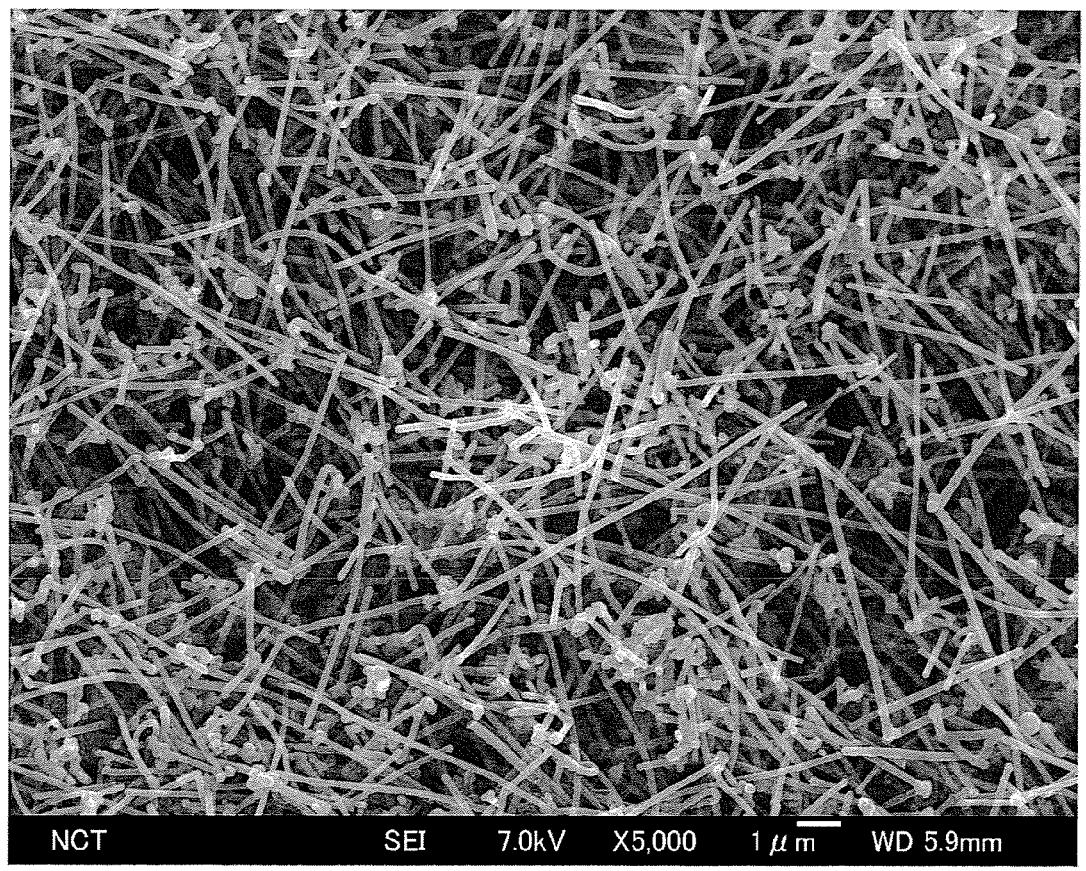
FIG. 21 is a SEM photo of carbon fibers which were produced in Example 5 (photo-magnification of ×5,000).

On the operation, the cooling gas was not allowed to flow, and therefore, the temperature control of the temperature zones (A), (B), and (C) shown in FIG. 5 were not performed. The reaction yield was found to be 66.7%. With respect to the carbon fibrous aggregators which were obtained from the first intermediate after undergoing the above mentioned steps such as the heat treatment, it was found that the mean outer diameter of fibers was 63.8 nm, the standard deviation of fiber outer diameters was 20.3 nm, the coefficient of variation of the fiber outer diameters was 31.8%. The distribution of the fiber diameters is shown in Table 6, and the distribution histogram thereof is shown in FIG. 11.

As compared with the coefficient of variation of the fiber outer diameters of 31.8% in Control 1, the data of coefficient of variation of Examples 1-5 became smaller, i.e., 19.3%-28.9% Thus, in consideration of this fact, it is found that the optimization of the temperature zones (a), (b) and (c) using the cooling gas as shown in FIG. 5 is important on the manufacturing the carbon fibrous aggregators of which carbon fibers have a sharp outer diameter distribution of carbon fibers.

Pellets were prepared by blending 4.0 wt % of the carbon fibrous aggregators of Example 3 to a polycarbonate resin (Panlite® L-1225L, manufactured by Teijin Chemicals Ltd.), and then melt-kneading them with a twin screw vented extruder (TEM35, manufactured by Toshiba Machine Co., Ltd.). The same procedure as mentioned above was repeated except that 5.0 wt % of the carbon fibrous aggregators of Example 3, or 4.0 wt % of the carbon fibrous aggregators of Control 1 was used instead of 4.0 wt % of the carbon fibrous aggregators of Example 3.

The pellets thus obtained were dried at 120° C. for ten hours, and then the pellets were used for a injection molding under a prescribed condition (280° C., die's temperature 60° C.) to obtain test pieces (each piece size is 90 mm in length, 50 mm in width, 3 mm in thickness, and 4500 mm$^2$ in area).

The measured data of the surface resistivity are shown in Table 10. As shown in Table 10, The data of surface resistivity of the test piece in which carbon fibrous aggregators of Example 3 had been used was found that the variation value, ([the maximum value (or minimum value)−the mean value]/the mean value)×100%, is not more than ±50%.

TABLE 10

| | Sample No. of molded article | | | | | |
|---|---|---|---|---|---|---|
| | 1 | 2 | 3 | 4 | 5 | 6 |
| Control 1 (4.0 wt % of carbon fiber aggregators were added) | | | | | | |
| Surface resistivity 1 (Ω/□) | 3.0E+07 | 1.4E+08 | 1.6E+08 | 1.2E+08 | 4.3E+07 | 4.1E+07 |
| Surface resistivity 2 (Ω/□) | 9.3E+05 | 3.5E+07 | 1.1E+07 | 2.3E+07 | 1.8E+07 | 4.9E+07 |
| Surface resistivity 3 (Ω/□) | 1.2E+08 | 1.5E+08 | 1.0E+08 | 6.8E+07 | 5.0E+07 | 8.6E+07 |
| Surface resistivity 4 (Ω/□) | 5.1E+07 | 1.1E+08 | 9.0E+07 | 7.1E+07 | 3.7E+07 | 5.9E+07 |
| Mean value of surface resistivity ((Ω/□) | 5.1E+07 | 1.1E+08 | 9.0E+07 | 7.1E+07 | 3.7E+07 | 5.9E+07 |
| [(Max value − mean value)/mean value] × 100% | 140.6% | 35.6% | 76.3% | 72.8% | 35.5% | 45.8% |
| [(Minimum value − mean value)/mean value] × 100% | −98.2% | −67.1% | −87.9% | −67.9% | −51.5% | −29.8% |
| Example 3 (4.0 wt % of carbon fiber aggregators were added) | | | | | | |
| Surface resistivity 1 (Ω/□) | 8.6E+04 | 7.8E+04 | 8.3E+04 | 9.3E+04 | 9.3E+04 | 9.0E+04 |
| Surface resistivity 2 (Ω/□) | 4.8E+04 | 4.6E+04 | 5.2E+04 | 5.3E+04 | 6.0E+04 | 5.5E+04 |
| Surface resistivity 3 (Ω/□) | 5.0E+04 | 5.0E+04 | 4.9E+04 | 6.5E+04 | 4.4E+04 | 3.8E+04 |
| Surface resistivity 4 (Ω/□) | 4.9E+04 | 6.2E+04 | 6.1E+04 | 7.0E+04 | 6.6E+04 | 6.1E+04 |
| Mean value of surface resistivity ((Ω/□) | 5.8E+04 | 5.9E+04 | 6.1E+04 | 7.0E+04 | 6.6E+04 | 6.1E+04 |
| [(Max value − mean value)/mean value] × 100% | 48.3% | 32.2% | 35.7% | 32.7% | 41.2% | 47.6% |
| [(Minimum value − mean value)/mean value] × 100% | −17.2% | −22.0% | −19.9% | −24.7% | −32.5% | −37.3% |

| EXPLANATION OF THE NUMERALS | |
|---|---|
| 1 | Manufacturing system of carbon fibers |
| 2 | Raw material tank |
| 3 | Raw material introducing tube |
| 4 | Gas tank |
| 5 | Gas introducing tube |
| 6 | Evaporator |
| 7 | Raw material mixture gas introducing tube |
| 8 | Reaction furnace |
| 9 | Inlet nozzle |
| 10 | Distributing and buffering board |
| 11 | Heating means |
| 12 | Carbon fiber collecting chamber |
| 13 | Gas exhaust tube |
| 14 | Raw material mixture gas introducing port |
| 15 | Cooling gas introducing port |
| 16 | Cooling gas exit port |
| 20 | Metal catalyst particle producing zone |
| 30 | Carbon fiber producing zone |

The invention claimed is:

1. Carbon fibrous aggregator obtained by a chemical vapor phase growing method, which comprises plural granular parts, and plural carbon fibers which are mutually independently extended outwardly from their respective granular parts so that each granular part is associated with two or more carbon fibers, wherein the carbon fibers show a three dimensional expansion in all; and which show a three dimensional network structure of the carbon fibers at least in a part by a state that at least a part of the plural carbon fibers extended from one granular part is linked with another granular part;

wherein mean length of carbon fibers which link two granular parts together is of 3.0-20.0 μm, and wherein a coefficient of variation, CV, ((standard deviation/mean value)×100) which is obtained on a determination of outer diameter distribution of the carbon fibers which constitute the aggregator of carbon fiber is not more than 30.0%.

2. The carbon fibrous aggregator according to claim 1, wherein coefficient of variations, CVs of outer diameter distribution of carbon fibers in (A) the range of from not less than 5 nm to not more than 45 nm, (B) the range of from not less than 5 nm to not more than 75 nm, (C) the range of from not less than 30 nm to not more than 120 nm, (D) the range of from not less than 40 nm to not more than 300 nm, and (E) the range of from not less than 60 nm to not more than 300 nm, are not more than 30.0%, respectively.

3. The carbon fibrous aggregator according to claim 1, wherein, the mean outer diameter of all the fibers used as standard data, the number of carbon fibers of which individual outer diameter is out of the range of ±50.0% variation from the mean outer diameter is not more than 12% of the total number of the carbon fibers.

4. The carbon fibrous aggregator according to claim 1, wherein two or more of units are continued, wherein each unit has a construction that carbon fibers are extended from a certain granular part as base point, these extended carbon fiber are linked with another granular part, and other carbon fibers are extended from the another granular part.

5. The carbon fibrous aggregator according to claim 1, wherein at the extended parts from their respective granular parts, carbon fibers are linked mutually with carbonaceous material at least partially, and wherein the sizes of granular parts are larger than the outside diameter of the carbon fibers.

6. The carbon fibrous aggregator according to claim 1, wherein the ratio of the mean diameter of the granular parts to the mean outer diameter of the carbon fibers are in the range of 3.0-11.0.

7. The carbon fibrous aggregator according to claim 1, wherein at least three carbon fibers are extended from each granular part.

8. The carbon fibrous aggregator according to claim 1, which has an $I_D/I_G$ ratio of not more than 0.2, which is determined by Raman spectroscopy.

9. The carbon fibrous aggregator according to claim 1, which has an area-based circle-equivalent mean diameter of 20-150 μm, and a powder electric resistance, determined under a pressed density of the carbon fibrous aggregators, 0.8 g/cm$^3$, of not more than 0.030 Ω·cm.

10. The carbon fibrous aggregator according to claim 1, which has a specific surface of 10-60 m$^2$/g.

11. The carbon fibrous aggregator according to claim 1, which has a combustion initiation temperature in air of 700-900° C.

12. The carbon fibrous aggregator according to claim 1, which is produced using a reaction system which comprises a reaction furnace and a raw material introducing nozzle connected to the furnace, wherein a distributing and buffering board is provided around the raw material introducing nozzle at a heated temperature zone of 400-900° C. in the furnace, and a cooling device is provided at a position of contacting to the raw material introducing nozzle.

13. Composite material which comprises a matrix and the carbon fibrous aggregators according to claim 1, wherein an amount of the carbon fibrous aggregators added to the matrix is in a range of 0.1 to 50.0% by weight based on a total weight of the composite material.

14. The composite material according to claim 13, wherein the matrix comprises at least an organic polymer.

15. The composite material according to claim 13, wherein the matrix comprises at least an inorganic material.

16. The composite material according to claim 13, wherein the matrix comprises at least a metal.

17. The composite material according to claim 13, which further comprises at least one kind of filling agent selected from the group which consists of metallic minute particle, silica, calcium carbonate, magnesium carbonate, carbon black, glass fibers and carbon fibers other than the above mentioned carbon fibrous aggregator.

* * * * *